US011079600B2

(12) United States Patent
Cazalet

(10) Patent No.: US 11,079,600 B2
(45) Date of Patent: Aug. 3, 2021

(54) INTERCHANGEABLE EYEWEAR/HEAD-MOUNTED DEVICE ASSEMBLY WITH QUICK RELEASE MECHANISM

(71) Applicant: Google LLC, Mountain View, CA (US)

(72) Inventor: Peter Michael Cazalet, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/671,676

(22) Filed: Nov. 1, 2019

(65) Prior Publication Data
US 2020/0064639 A1 Feb. 27, 2020

Related U.S. Application Data

(63) Continuation of application No. 15/813,740, filed on Nov. 15, 2017, now Pat. No. 10,488,668, which is a continuation of application No. 14/459,052, filed on Aug. 13, 2014, now Pat. No. 9,851,567.

(51) Int. Cl.
*G02B 27/01* (2006.01)
*G02C 5/22* (2006.01)

(52) U.S. Cl.
CPC ..... *G02B 27/0176* (2013.01); *G02B 27/0149* (2013.01); *G02C 5/2209* (2013.01); *G02B 2027/015* (2013.01); *G02B 2027/0156* (2013.01); *G02B 2027/0178* (2013.01)

(58) Field of Classification Search
CPC ............ G02B 27/0176; G02B 27/0149; G02B 2027/0178; G02B 2027/015; G02B 2027/0156; G02C 5/2209; G02C 5/146

USPC ....................................................... 351/116
See application file for complete search history.

(56) References Cited

U.S. PATENT DOCUMENTS

| 3,423,150 A | 1/1969 | Freed |
| D327,079 S | 6/1992 | Allen |
| 5,739,959 A | 4/1998 | Quaglia |
| D397,350 S | 8/1998 | Jannard et al. |

(Continued)

FOREIGN PATENT DOCUMENTS

| AT | 404193 B | 9/1998 |
| CN | 1336564 A | 2/2002 |

(Continued)

OTHER PUBLICATIONS

"6 Glasses With Integrated Displays That You Can Buy Today" [online], retrieved from the internet: <http://www.wired.com/2012/04/6-glasses-with-integrated-displays-that-you-can-buy-today>, Apr. 11, 2012.

(Continued)

*Primary Examiner* — Marin Pichler
*Assistant Examiner* — Henry A Duong
(74) *Attorney, Agent, or Firm* — Lerner, David, Littenberg, Krumholz & Mentlik, LLP

(57) ABSTRACT

A head-mounted device includes a central frame support and at least one removably connected optics arm. The at least one optics arm has first and second free ends that are removably connected to a second end of the central frame support at a point between the first and second free ends. The optics arm extends away from the central frame support and is configured to present information to the user via a display device.

18 Claims, 30 Drawing Sheets

(56) References Cited

U.S. PATENT DOCUMENTS

| | | |
|---|---|---|
| D402,651 S | 12/1998 | Depay et al. |
| D427,622 S | 7/2000 | Conway |
| 6,438,798 B1 | 8/2002 | Chene et al. |
| D539,830 S | 4/2007 | Saderholm et al. |
| 7,264,349 B1 | 9/2007 | Ku |
| D565,090 S | 3/2008 | Yee |
| 7,497,571 B2 | 3/2009 | Rossin |
| 7,631,968 B1 | 12/2009 | Dobson et al. |
| 7,753,520 B2 | 7/2010 | Fuziak, Jr. |
| D624,111 S | 9/2010 | Knoop |
| 7,794,080 B2 | 9/2010 | Zelazowski |
| 8,016,415 B2 | 9/2011 | Figler et al. |
| 8,038,292 B2 * | 10/2011 | Matsumoto ............. G02C 9/00 351/158 |
| D649,177 S | 11/2011 | Cho et al. |
| D650,002 S | 12/2011 | Zoonens |
| 8,109,629 B2 | 2/2012 | Howell et al. |
| 8,136,940 B2 | 3/2012 | Tsai |
| D658,226 S | 4/2012 | Sierra et al. |
| D659,137 S | 5/2012 | Matsumoto |
| D659,739 S | 5/2012 | Olsson et al. |
| D659,740 S | 5/2012 | Olsson et al. |
| D659,741 S | 5/2012 | Heinrich et al. |
| D660,341 S | 5/2012 | Olsson et al. |
| D662,964 S | 7/2012 | Olsson et al. |
| D664,184 S | 7/2012 | Olsson et al. |
| D664,185 S | 7/2012 | Heinrich et al. |
| D664,586 S | 7/2012 | Olsson |
| D665,838 S | 8/2012 | Kim et al. |
| D666,237 S | 8/2012 | Olsson et al. |
| D668,704 S | 10/2012 | Menard et al. |
| D669,066 S | 10/2012 | Olsson et al. |
| D669,522 S | 10/2012 | Klinar et al. |
| D671,589 S | 11/2012 | Olsson |
| D671,590 S | 11/2012 | Klinar et al. |
| 8,337,014 B2 | 12/2012 | Kokonaski et al. |
| D680,152 S | 4/2013 | Olsson et al. |
| 8,414,120 B2 | 4/2013 | Cheong |
| D685,019 S | 6/2013 | Li |
| D692,046 S | 10/2013 | Fuchs |
| D697,130 S | 1/2014 | Lovgren |
| D697,962 S | 1/2014 | Olsson |
| D701,506 S | 3/2014 | Pombo |
| D703,724 S | 4/2014 | Olsson |
| D704,247 S | 5/2014 | Olsson et al. |
| D706,858 S | 6/2014 | Markovitz et al. |
| D708,181 S | 7/2014 | Olsson et al. |
| D710,928 S | 8/2014 | Heinrich et al. |
| D711,374 S | 8/2014 | Lee et al. |
| D711,376 S | 8/2014 | Lee et al. |
| 8,840,242 B2 | 9/2014 | Martin |
| D716,299 S | 10/2014 | Olsson et al. |
| D716,805 S | 11/2014 | Olsson et al. |
| D716,806 S | 11/2014 | Olsson et al. |
| D716,807 S | 11/2014 | Yeom et al. |
| D716,808 S | 11/2014 | Yeom et al. |
| D718,305 S | 11/2014 | Olsson et al. |
| D718,366 S | 11/2014 | Mehin et al. |
| D718,765 S | 12/2014 | Olsson |
| D719,157 S | 12/2014 | Lee et al. |
| D719,567 S | 12/2014 | Kim et al. |
| D719,568 S | 12/2014 | Heinrich et al. |
| D719,570 S | 12/2014 | Heinrich et al. |
| D719,952 S | 12/2014 | Kim et al. |
| D719,998 S | 12/2014 | Markovitz et al. |
| D723,553 S | 3/2015 | Choo et al. |
| D724,082 S | 3/2015 | Olsson et al. |
| D724,083 S | 3/2015 | Olsson et al. |
| D725,101 S | 3/2015 | Lee et al. |
| D725,102 S | 3/2015 | Lee et al. |
| D725,103 S | 3/2015 | Olsson et al. |
| D725,104 S | 3/2015 | Olsson et al. |
| D725,105 S | 3/2015 | Olsson et al. |
| D725,106 S | 3/2015 | Olsson et al. |
| D725,654 S | 3/2015 | Lee et al. |
| 8,968,012 B2 | 3/2015 | Olsson et al. |
| 8,976,085 B2 | 3/2015 | Olsson et al. |
| 8,979,259 B2 | 3/2015 | Haddock et al. |
| D726,720 S | 4/2015 | Lee et al. |
| D726,721 S | 4/2015 | Olsson |
| D727,317 S | 4/2015 | Olsson et al. |
| D728,564 S | 5/2015 | Olsson et al. |
| D733,709 S | 7/2015 | Kawai |
| D734,332 S | 7/2015 | Olsson et al. |
| D737,272 S | 8/2015 | Olsson et al. |
| D738,373 S | 9/2015 | Davies et al. |
| D738,420 S | 9/2015 | Lee et al. |
| D740,284 S | 10/2015 | Maeda et al. |
| D740,813 S | 10/2015 | Bosveld et al. |
| D740,815 S | 10/2015 | Bosveld et al. |
| D745,007 S | 12/2015 | Cazalet et al. |
| D745,083 S | 12/2015 | Yoo et al. |
| D746,818 S | 1/2016 | Cho et al. |
| D749,074 S | 2/2016 | Cazalet et al. |
| D750,075 S | 2/2016 | Olsson et al. |
| D751,551 S | 3/2016 | Ho et al. |
| D751,552 S | 3/2016 | Osterhout |
| D752,129 S | 3/2016 | Lee et al. |
| D757,005 S | 5/2016 | Cazalet et al. |
| D757,006 S | 5/2016 | Cazalet et al. |
| D757,007 S | 5/2016 | Cazalet et al. |
| D763,258 S | 8/2016 | Cazalet et al. |
| D768,230 S | 10/2016 | Darcy |
| D769,361 S | 10/2016 | Markovitz et al. |
| D771,735 S | 11/2016 | Lee et al. |
| D776,751 S | 1/2017 | Cazalet et al. |
| D782,477 S | 3/2017 | Cazalet et al. |
| D786,958 S | 5/2017 | Grasset |
| D809,586 S | 2/2018 | Cazalet et al. |
| 2002/0021407 A1 | 2/2002 | Elliott |
| 2005/0237271 A1 | 10/2005 | Yamamoto |
| 2008/0198324 A1 | 8/2008 | Fuziak |
| 2008/0232494 A1 | 9/2008 | Pan et al. |
| 2009/0225721 A1 | 9/2009 | Cudak et al. |
| 2010/0073262 A1 | 3/2010 | Matsumoto |
| 2010/0110368 A1 | 5/2010 | Chaum |
| 2010/0162525 A1 | 7/2010 | Wienicke et al. |
| 2010/0245757 A1 | 9/2010 | Sugihara et al. |
| 2010/0271588 A1 | 10/2010 | Kokonaski et al. |
| 2011/0012814 A1 | 1/2011 | Tanaka |
| 2013/0044042 A1 | 2/2013 | Olsson et al. |
| 2013/0169922 A1 | 7/2013 | Austin |
| 2013/0235331 A1 | 9/2013 | Heinrich et al. |
| 2013/0249776 A1 | 9/2013 | Olsson et al. |
| 2013/0258270 A1 | 10/2013 | Cazalet et al. |
| 2013/0321757 A1 | 12/2013 | Chen |
| 2014/0028968 A1 | 1/2014 | Olsson et al. |
| 2014/0059803 A1 | 3/2014 | Kidouchim |
| 2014/0218269 A1 | 8/2014 | Cazalet et al. |
| 2014/0364967 A1 | 12/2014 | Sullivan |
| 2014/0368787 A1 | 12/2014 | Gottardi et al. |
| 2015/0042544 A1 | 2/2015 | Sugihara et al. |
| 2015/0261015 A1 * | 9/2015 | Han ................ G02B 27/0176 351/158 |
| 2017/0045754 A1 | 2/2017 | Rubaud et al. |

FOREIGN PATENT DOCUMENTS

| | | |
|---|---|---|
| CN | 103676152 A | 3/2014 |
| JP | 2013044833 A | 3/2013 |
| JP | D1470899 | 6/2013 |
| JP | D1481043 | 10/2013 |
| JP | D1481044 | 10/2013 |
| JP | D1486009 | 12/2013 |
| JP | D1486010 | 12/2013 |
| JP | D1486011 | 12/2013 |
| JP | D1486012 | 12/2013 |
| JP | D1486013 | 12/2013 |
| JP | D1486014 | 12/2013 |
| JP | D1500090 | 6/2014 |
| JP | D1521286 | 4/2015 |
| JP | D1528431 | 7/2015 |
| KR | 30-0713083 | 10/2013 |
| KR | 30-0713083-01 | 10/2013 |

(56) References Cited

FOREIGN PATENT DOCUMENTS

| KR | 30-0727568 | 1/2014 |
| KR | 30-0727569 | 1/2014 |
| KR | 2014-0035106 A | 3/2014 |
| TW | 098172 | 4/1988 |
| TW | D133959 | 3/2010 |
| TW | D138375 | 12/2010 |
| TW | D155850 | 9/2013 |
| TW | D161033 | 6/2014 |
| TW | D161034 | 6/2014 |
| TW | D163326 | 10/2014 |
| WO | 9322704 A1 | 11/1993 |

OTHER PUBLICATIONS

Decision of Registration and Notice of References for Japanese Design Patent Application No. 2015-019405 dated Mar. 1, 2016.
Decision of Registration and Notice of References for Japanese Design Patent Application No. 2015-019406 dated Mar. 2, 2016.
Examination Report dated Jun. 16, 2016, for Taiwanese Design Patent Application No. 103307626.
Examination Report dated Jun. 16, 2016, for Taiwanese Design Patent Application No. 103307627.
Examination Report dated Jun. 16, 2016, for Taiwanese Design Patent Application No. 105300732.
Examination Report dated May 26, 2016, for Taiwanese Design Patent Application No. 105300731.
Examination Report for Taiwanese Design Patent Application No. 103307586, dated Nov. 20, 2015.
International Search Report and Written Opinion for PCT Application No. PCT/US2015/044834, dated Nov. 19, 2015.
Kadokawa Corporation. "Weekly Ascii." No. 877, vol. 24, p. 12. Published Apr. 10, 2012.
Kadokawa Corporation. "Weekly Ascii." No. 937, vol. 25, p. 18. Published on Jul. 1, 2013.
Notice of Allowance for Chinese Patent Application No. 201580031376. 1, dated Dec. 21, 2018.
Optical head-mounted display, from Wikipedia, Sep. 18, 2014.
Partial Supplementary European Search Report for European Patent Application No. 15832095.2 dated Feb. 20, 2018. 11 pages.
Tim Spears. "JET sports smart-glasses created by recon instruments and woke design." designboom. Oct. 6, 2014. Retrieved from the Internet. <http://www.designboom.com/technology/jet-sports-smart-glasses-recon-10-06-2014/>.
Notification of First Office Action for Chinese Patent Application No. 201580031376.1 dated May 14, 2018.
Extended European Search Report for European Patent Application No. 15832095.2 dated Jun. 7, 2018. 10 pages.

* cited by examiner

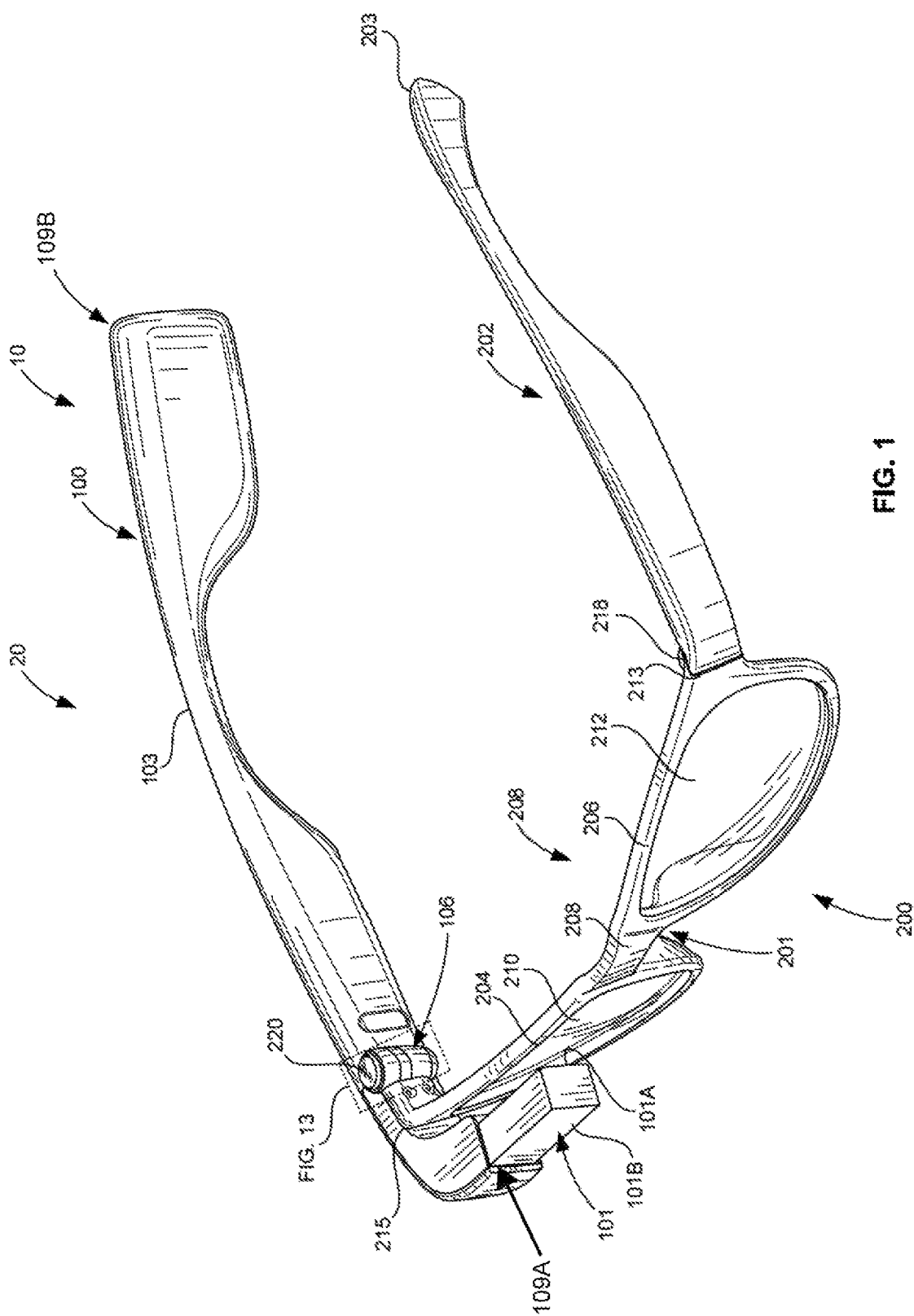

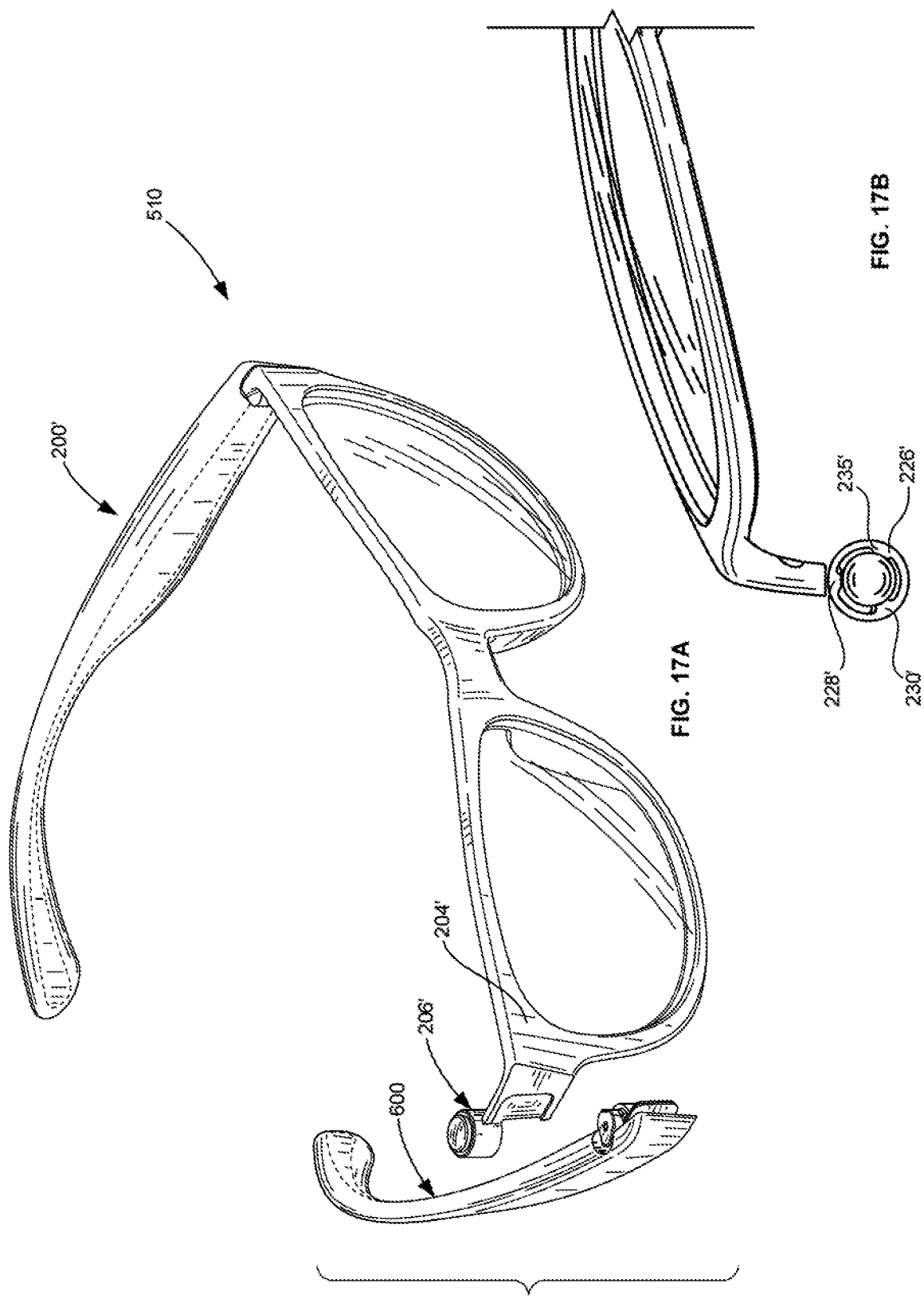

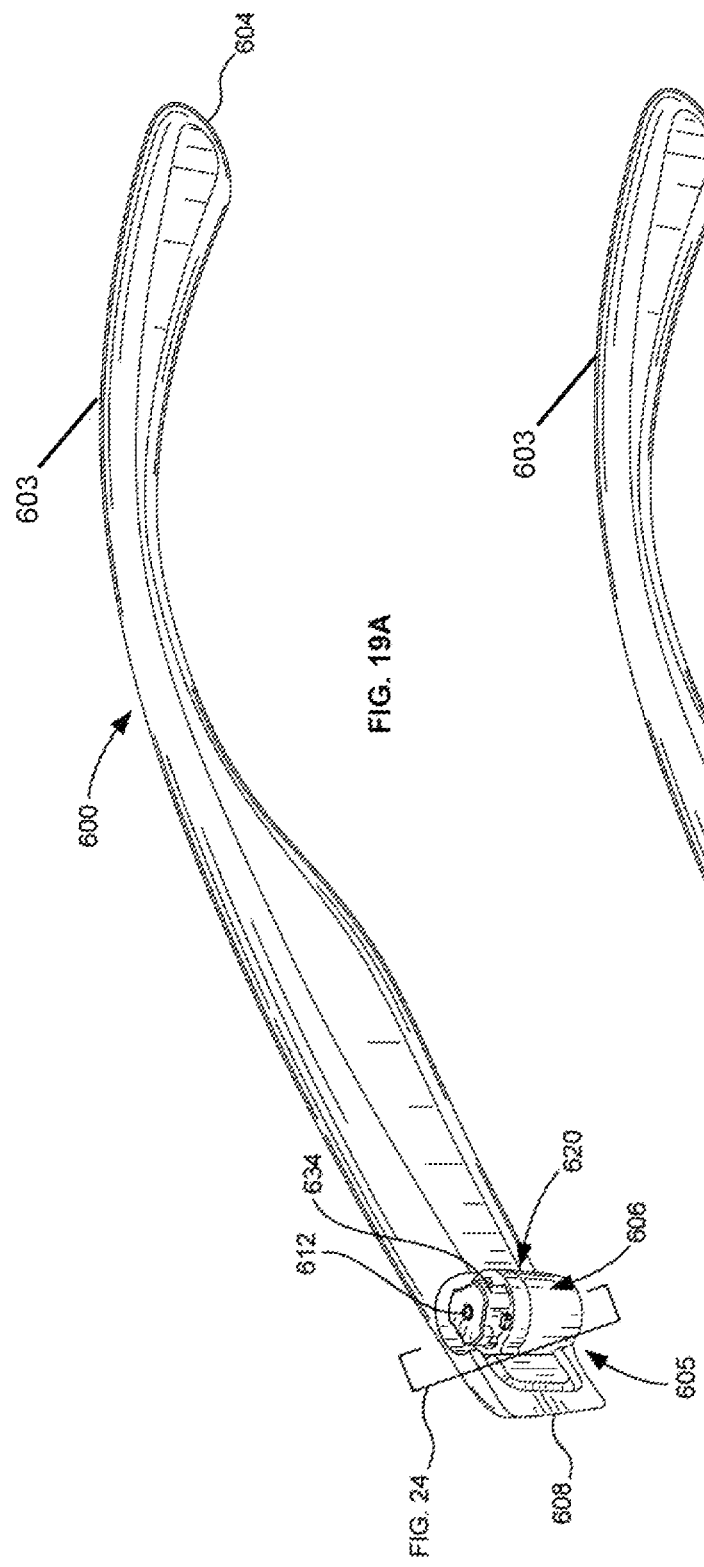
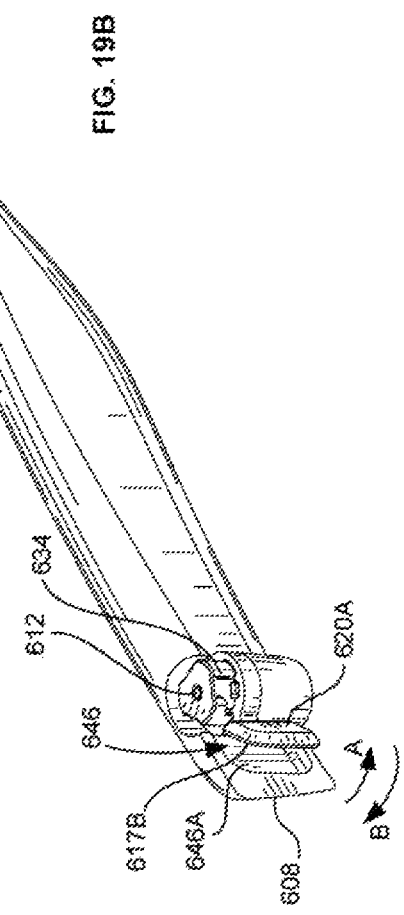
FIG. 19A
FIG. 19B

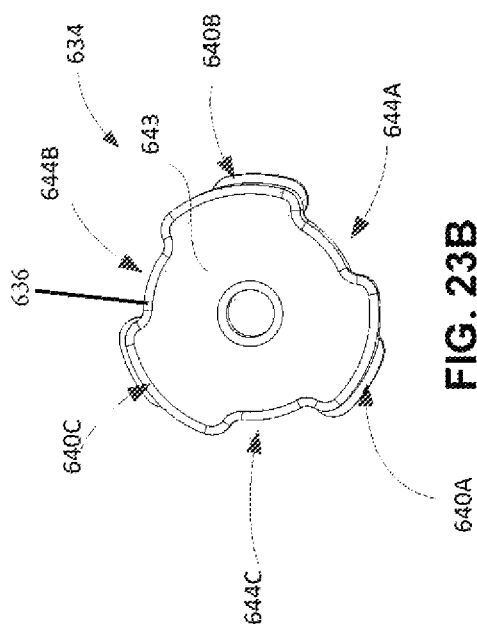
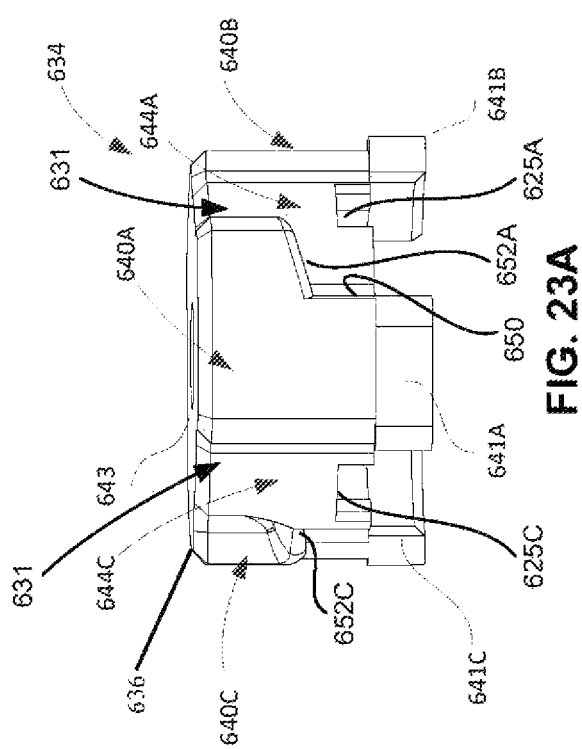

INTERCHANGEABLE EYEWEAR/HEAD-MOUNTED DEVICE ASSEMBLY WITH QUICK RELEASE MECHANISM

CROSS-REFERENCE TO RELATED APPLICATIONS

The present application is a continuation of U.S. patent application Ser. No. 15/813,740, filed Nov. 15, 2017, which is a continuation of U.S. patent application Ser. No. 14/459,052, filed Aug. 13, 2014, the disclosures of which are incorporated herein by reference.

BACKGROUND

Computing devices such as personal computers, laptop computers, tablet computers, cellular phones, and countless types of internet-capable devices are increasingly prevalent in numerous aspects of modern life. The trend toward miniaturization of computing hardware, peripherals, as well as sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) that the displayed image appears as a normal-sized image, such as might be displayed on a traditional image display device. The relevant technology may be referred to as "near-eye displays."

Computing devices with near-eye displays may also be referred to as "head-mountable displays," "head-mounted displays," "head-mounted devices," or "head-mountable devices." A head-mountable or head-mounted device places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display, for example.

Additional improvements are needed to provide for a more compact head-mounted device that can accommodate the needs of a user in a variety of different situations.

BRIEF SUMMARY

This technology generally relates to wearable computing devices and interchangeable eyewear/head-mounted device assemblies that enable a user to quickly convert a modified eyeglass or sunglass frame back and forth between a head-mounted device and a pair of eyeglasses/sunglasses. The technology also permits convenient transport or storage of individual components of the eyewear or head-mounted device assembly when not in use. In particular, mechanisms that provide for interchangeability among the different components of the assembly are described. In one example, a fixed bayonet attached to a removable optics arm interlocks with a connector on an eyeglass/sunglass frame or band to form a fully assembled head-mounted device. In another example, a moveable bayonet and a pull tab of a removable eyeglass temple arm can interlock with the same connector on the modified eyeglass/sunglass frame to form a pair of eyeglasses/sunglasses. The combination of the bayonet and corresponding connector on the eyeglass/sunglass frame or band is one example of a mechanism that allows for quick interchangeability among an eyeglass/sunglass frame, band, removable optics arm, and removable temple arm without the need for external tools. Other mechanisms for joining these components together are also contemplated herein.

In accordance with a first aspect of the disclosed embodiments, a head-mounted device includes a central frame support, a first side arm, and a second side arm. The first side arm extends from a first end of the central frame support and is movable relative to the central frame support. The second side arm has first and second free ends. The second side arm is at a point between the first and second free ends. The second side arm extends away from the central frame support and is configured to present information to the user via a display device. In one example, the central frame support can be an eyeglass frame but, in other examples, different types of eyewear, including a band, may be used.

In one example of this aspect, the central frame support includes a first connector mechanism adjacent the second end of the central frame support. The second side arm further includes a second connector mechanism. The first and second connector mechanisms may be constructed and arranged to interlock with one another. In one example, the second connector mechanism is a bayonet and the first connector mechanism interlocks with the bayonet. The bayonet may also include recesses for receiving the first connector mechanism. The first connector mechanism can further be comprised of a plurality of protrusions configured to fit within the recesses of the bayonet, such that when the protrusions are positioned within the recesses of the bayonet, the protrusions are interlocked with the bayonet.

In another example of this aspect, when one of the first and second connector mechanisms is rotated relative to the other, the second side arm is disconnected from the central frame support.

In another example of this aspect, the second side arm can rotate relative to the central frame support along an axis between the first and second free ends. The second connector mechanism can also extend along the axis. The second side arm may further comprise a first part and a second part. The first and second parts may be configured to move relative to one another along the axis.

In still another example of this aspect of the disclosed embodiments, the first and second side arms may be constructed and arranged to secure the head-mounted device to the head of a user.

In accordance with a second aspect of the presently disclosed embodiments, an optics arm for a head-mounted device assembly can be configured to present information to the user through the display device. The optics arm may include an outer housing with first and second free ends, a display device, and a connector positioned between the first and second free ends. The connector can be constructed and arranged to interlock with another component that is external to the optics arm. At least a portion of the outer housing can be adjacent the second free end and can be contoured to fit over the ear of a user. In one example, the connector may include a bayonet. All of the electronic components of the head-mounted device assembly may be housed within the outer housing.

In another example of this aspect, the optics arm further includes first and second parts that are rotatable relative to one another along an axis, and the connector can also extend along the axis. At least a portion of the first part may be curved and the second part may have a length greater than a length of the first portion. The second part may extend generally perpendicular to the first part.

In accordance with a third aspect of the presently disclosed embodiments, eyewear includes an eyeglass frame unit and an eyeglass temple side arm. The eyeglass frame may include a central frame support having first and second ends, a frame side arm that extends away from the first end, and a first connector mechanism that is adjacent a first end of the central frame support. The eyeglass temple side arm may be removably connected to the first connector mechanism and rotatably connected to the eyeglass frame unit. The eyeglass temple may include a second connector mechanism that is constructed and arranged to interlock with the first connector mechanism. The second connector mechanism may be aligned along the same axis about which the eyeglass temple side arm rotates relative to the eyeglass frame unit.

In one example of this aspect, the second connector mechanism may include a bayonet that has a top surface, a bottom surface, and recesses extending between the first and second surfaces. The second connector mechanism may further include a tab that is constructed and arranged to be manipulated by a user between a first position and a second position. The tab may move from the first position to the second position, and the bayonet may move relative to the first connector mechanism.

In accordance with a fourth aspect, a modular kit for an eyewear/head-mounted device assembly includes an eyeglass frame unit, an eyeglass temple side arm, and an optics arm. The eyeglass frame unit may include a central frame support that has first and second ends. A frame side arm may extend away from the first end, and a first connector mechanism may be adjacent a second end of the central frame support. The eyeglass temple side arm may be configured for removable connection to the first connector mechanism and rotatably connected to the eyeglass frame unit. The eyeglass temple side arm may also include a second connector mechanism constructed and arranged to interlock with the first connector mechanism. The optics side arm may be configured for removable connection to the central frame support. The optics side arm may include a third connector mechanism that is constructed and arranged to interlock with the first connector mechanism. The optics side arm may be configured to extend away from the central frame support and to present information to the user via a display device.

In one example of this aspect, the second connector mechanism may be a bayonet and the first connector mechanism may interlock with the bayonet. The optics side arm may also include first and second free ends, as well as first and second parts rotatable relative to one another along an axis positioned between the first and second free ends. The third connector mechanism may also extend along this axis.

BRIEF DESCRIPTION OF THE DRAWINGS

FIG. 1 is a perspective view of an example embodiment of an interchangeable eyewear/head-mounted device assembly, in accordance with aspects of the disclosure.

FIG. 17A is a perspective view of the disassembled components of another example interchangeable eyewear/head-mounted device assembly, in accordance with aspects of the disclosure.

FIG. 17B is an enlarged bottom perspective view of a portion of a component of the interchangeable eyewear/head-mounted device assembly of FIG. 17A.

FIG. 19A is a side perspective view of an example component of the interchangeable eyewear/head-mounted assembly of FIG. 18A.

FIG. 19B is a side perspective view illustrating the component of FIG. 19A in a second position.

FIGS. 23A and 23B are respective front and top views of another example component of the example hinge and connector assembly of FIG. 20.

DETAILED DESCRIPTION

Figure 1A:
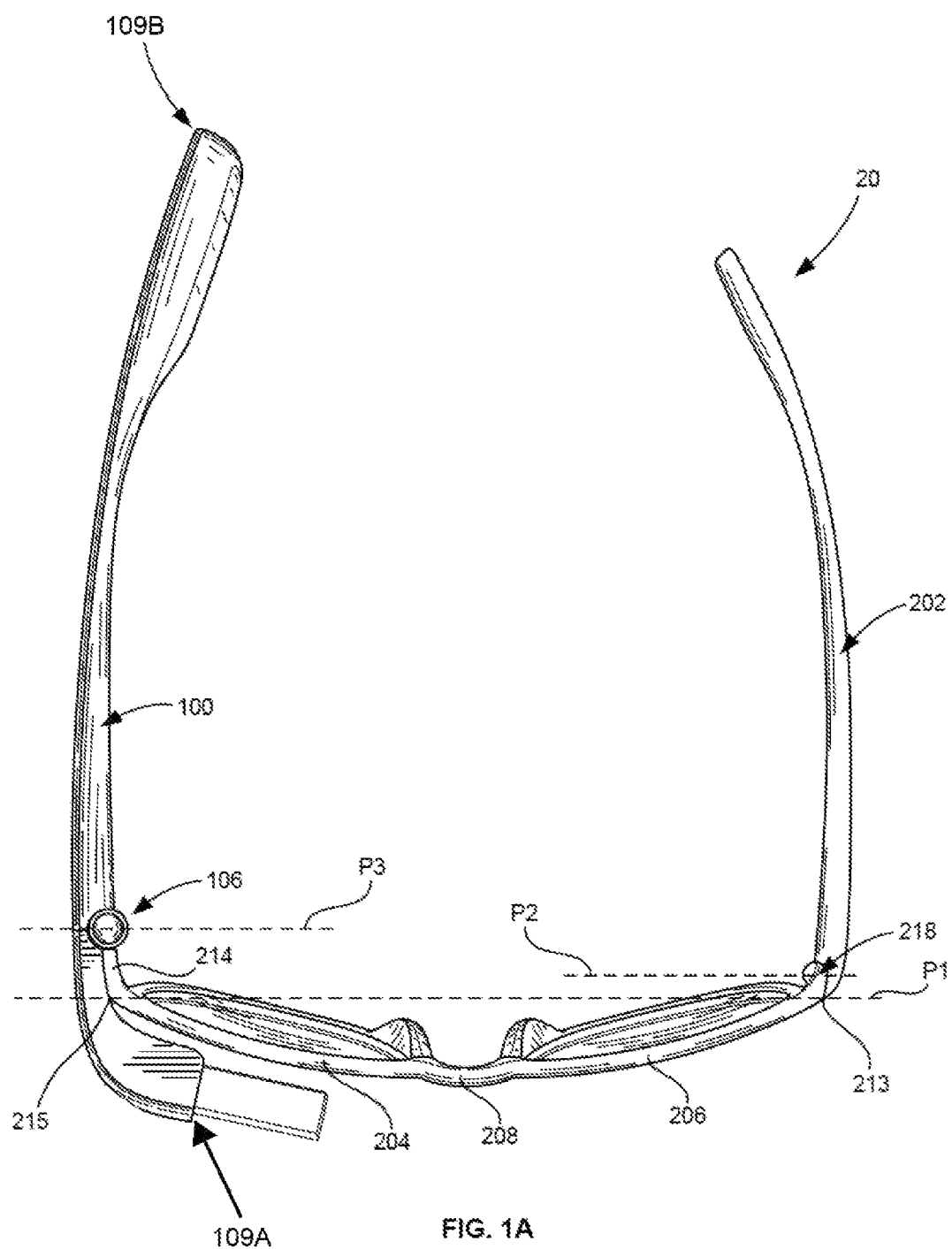
FIG. 1A is a top plan view of FIG. 1.

Example methods and systems are described herein. It should be understood that the words "example" and "exemplary" are used herein to mean "serving as an example, instance, or illustration." Any embodiment or feature described herein as an "example" or being "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

FIG. 1 is an example of an interchangeable eyewear/head-mounted device assembly 10 that utilizes a hinge and connector assembly 106 according to aspects of the disclosure. In particular, assembly 10 is a wearable computing system or head-mounted device 20 that is capable of receiving, transmitting, and displaying data. As shown, head-mounted device 20 is one example of a glasses-style, head-mounted device possessing an overall appearance that is similar to a conventional pair of eyeglasses or sunglasses. While FIG. 1 illustrates an example of a head-mounted device 20, other types of head-mounted devices could additionally or alternatively be used, some examples of which will be discussed herein.

It is to be appreciated that reference made to an eyeglass frame or a pair of eyeglasses herein is not limited to any one type of eyeglasses or eyewear, but can include prescription and non-prescription sunglasses, prescription and non-prescription eyeglasses, or any type of eyewear that can be used for a head-mounted device or eyewear assembly that may or may not include lenses. For ease of discussion, reference will be made to an eyeglass frame or eyeglasses, but it is to be understood that such description is applicable to all types of eyewear. Additionally, references to lens elements or lenses can refer to prescription lenses, non-prescription lenses, tinted lenses, or any type of lenses that may be desired by a user.

Head-mounted device 20 includes a modified eyeglass frame 200 comprised of several components, including lens frames 204,206, a middle frame support 208, lens elements 210,212, and a first side arm or frame arm 202 extending away from lens frame 206. The combination of lens elements 210,212, as well as middle frame support 208, forms a unified central frame support 201. Each of the lens frames 204,206 and frame arm 202 of modified eyeglass frame 200 may be formed of a solid structure of plastic and/or metal, or may be formed from hollow structure of similar materials. Other materials are contemplated within the scope of the invention. A movable button 220 on the modified eyeglass frame 200 can be used to communicate with the electronics in the system, including instructing the system to acquire still images or video.

Head-mounted device 20 further includes a second side arm or an optics arm 100 extending away from lens frame 206. In this example, optics arm 100 is connected to modified eyeglass frame 200 and houses all of the electronic components of head-mounted device 20. For example, optics arm 100 may house the electrical circuitry, battery, processors, speakers, audio, and the like, that are used to operate the device. Optics arm may also further include a light pass hole (not shown) and an imaging device (not shown), such as a camera, facing outward, which can capture either or both still and video images.

Optics arm 100 includes an outer housing 103 that may be a plastic hollow structure for housing the electronic components. Outer housing 103 may be comprised of plastic or metal components, or a combination thereof. Display 101 extends from a first free end 109A of outer housing 103 and is in the form of a generally-transparent prism that is configured to overlay or combine with the user's sight an image generated by electronic display components that are positioned within the outer housing 103 of optics arm 100. Such a prism can be structured to receive a projected image in receiving side 101A and to make that image visible to a user by looking into viewing side 101B of display 101.

Frame arm 202 and optics arm 100 secure the head-mounted device 20 to the head of a user. In this example, frame arm 202 extends in a direction away from outer edge 213 of central frame support 201 and is designed to fit over the ear of a user to secure the head-mounted device 20 to one side of the user's head. Optics arm 100 is removably connected to modified eyeglass frame 200 and extends in a direction away from the opposed outer edge 215 of central frame support 201. Optics arm 100 is constructed and arranged to fit over the other ear of a user to help secure the head-mounted device 20 to the other side of the user's head. Optics arm 100 and frame arm 202 may further secure the head-mounted device 20 to the user by either or both optics arm 100 and frame arm 202 extending around a rear portion of the user's head.

Frame arm 202 moves about hinge 218 and optics arm moves about hinge and connector assembly 106 from an open or extended position to the folded position. This allows for transport and compact storage of the assembled head-mounted device 20 when not in use. Frame arm 202 pivots about hinge 218 and folds over at a slightly downward position relative to lens frames 204,206. For example, frame arm 202 may fold over at a 15 degree angle with respect to a lateral axis of central frame support 201 to avoid interfering or contacting hinge and connector assembly 106. Frame arm 202 can then be positioned with only a portion of free end 203 extending beyond hinge and connector assembly 106 of optics arm 100. Optics arm 100 may pivot about hinge and connector assembly 106 and fold over approximately at a 90 degree angle with respect to a lateral axis of central frame support 201. Second free end 109B of optics arm 100 will extend beyond hinge 218 of frame arm 202.

The position of hinge and connector assembly 106 and hinge 218 relative to the ends of lens frames 204,206 may differ. For example, with reference to FIG. 1A, outer edge 215 of central frame support 201 and outer edge 213 of central frame support 201 are positioned along the same plane P1. Hinge 218 is positioned adjacent the outer edge 213 of central frame support 201 along plane P2. Hinge and connector assembly 106 is offset and spaced away from outer edge 215 of lens frame 206 by flange 214. Flange 214 extends away from lens frame 204 in a direction toward the rear end of head-mounted device 20. As a result, hinge 218 is positioned along a plane P3 that extends parallel to first planes P1 and P2.

Head-mounted device 20 has an overall asymmetric "U" shape. For example, as shown in FIG. 1A, frame arm 202, optics arm 100, lens frames 204,206, and central frame support 201 form an asymmetric U-shape structure. As shown, free end 109 of optics arm 100 extends beyond free end 203 of frame arm 202.

Figure 2:
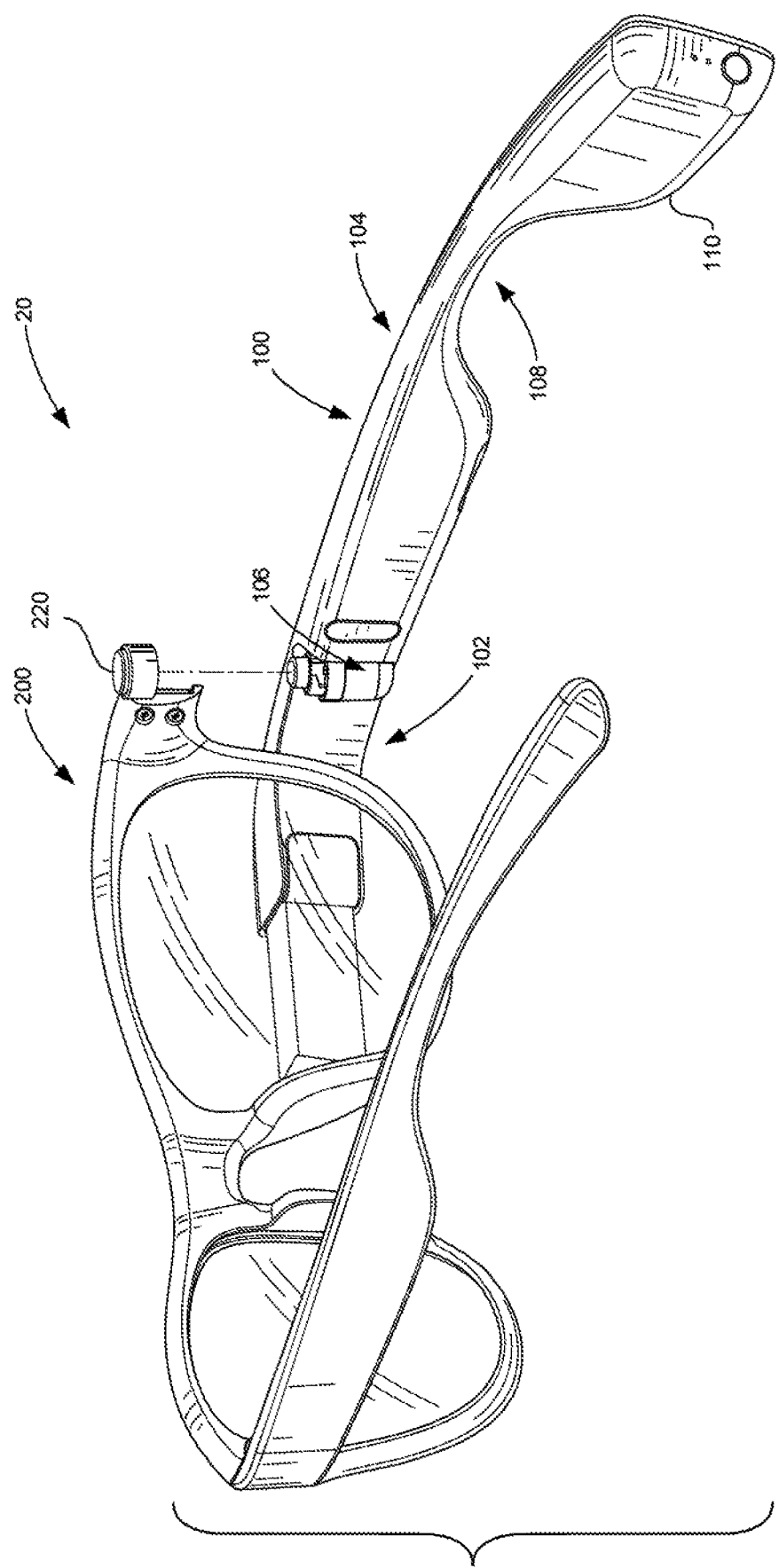
FIG. 2 is a perspective view of the disassembled components of the interchangeable eyewear/head-mounted device assembly of FIG. 1.

Referring now to FIG. 2, the disassembled and interchangeable components of head-mounted device 20 are shown. In this example, head-mounted device 20 is comprised of two removably connected components: optics arm 100 and modified eyeglass frame 200. These components can be combined together to form a head-mounted device, but are also interchangeable with other components of an eyewear/head-mounted device assembly, including eyewear and head-mounted device components discussed herein.

Figure 3:
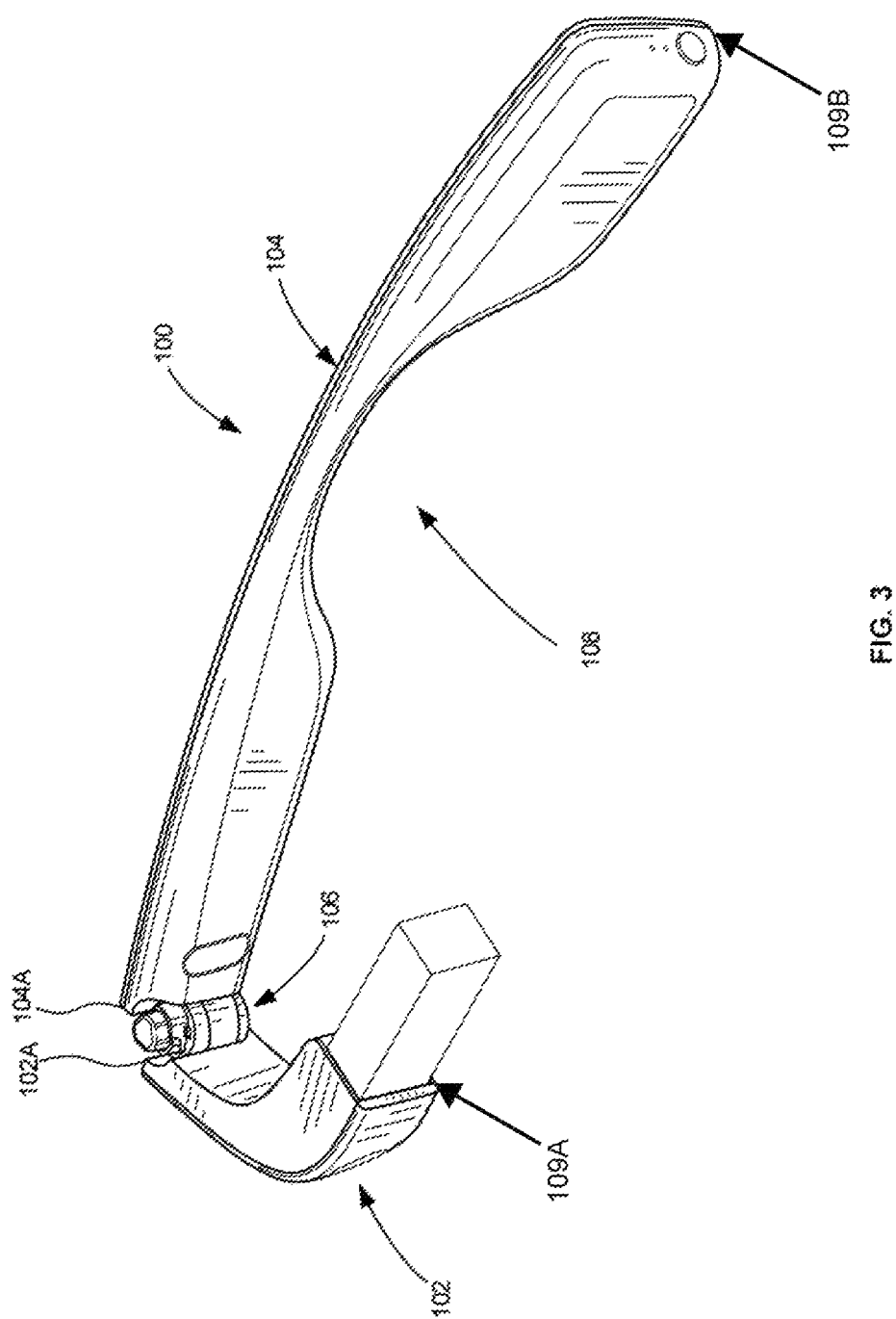
FIG. 3 is a perspective view of a component of the interchangeable eyewear/head-mounted device assembly of FIG. 2 in a folded position.

As shown in FIG. 3, optics arm 100 includes an optics pod 102, an optics temple 104, and a hinge and connector assembly 106 positioned between the optics pod 102 and optics temple 104. Optics pod 102 houses display 101 and includes a curved portion that wraps around in front of eyewear, such as modified eyeglass frame, so that display 101 can be properly positioned near the eye of the user when the optics arm 100 is joined with eyewear. As discussed above, optics temple 104 of optics arm 100 is the portion that functions as the side arm or temple of an assembled head-mounted device. Contoured portion 108 of optics arm 100 curves upward away from the bottom edge 110 of optics arm 100 so as to fit over the ear of a user (not shown).

Hinge and connector assembly 106 of optics arm 100 can provide several functions. In this example, hinge and connector assembly 106 allows optics temple 104 to pivot from a fully open position, where optics pod 102 and optics temple 104 form a continuous edge to a folded position. In the folded position, inner edges of optics pod 102 and optics temple 104 are exposed. For example, inner edge 102A of optics pod 102 and inner edge 104A of optics temple 104 are exposed. Moreover, as shown, optics pod is generally parallel to optics temple 104. Hinge and connector assembly 106 also provides the ability for optics arm 100 to connect to other eyewear structures, including eyewear, such as a modified eyeglass frame, that enable a user to wear optics arm 100 on his or her head.

Figure 4:
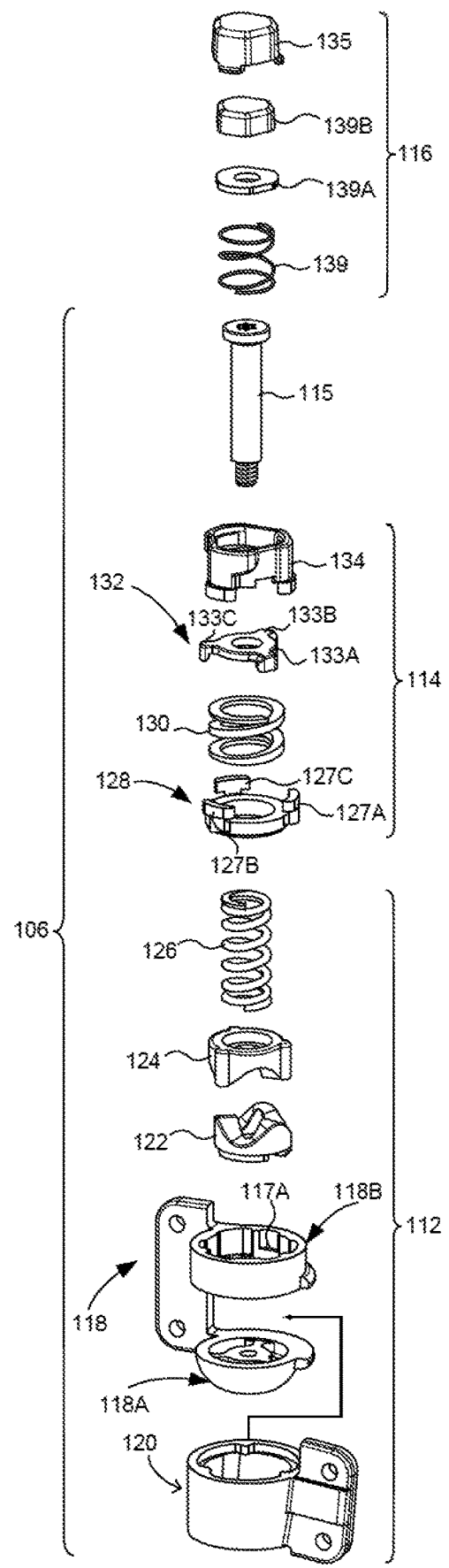
FIG. 4 is an exploded view of an example hinge and connector assembly shown in FIG. 3.

Example subassemblies and components of hinge and connector assembly 106 are shown in the exploded view of FIG. 4. In this example, hinge and connector assembly 106 includes a primary hinge subassembly 112, a connector subassembly 114, and a central shaft screw 115 that extends through primary hinge subassembly 112 and connector subassembly 114.

Primary hinge subassembly 112 of hinge and connector assembly 106 is an example assembly that enables optics arm 100 to move relative to modified eyeglass frame 200. Hinge and connector assembly 106 also permits the sections of optics arm to move relative to one another. In this example, primary hinge subassembly 112 includes a fixed hinge barrel 118; a rotating hinge barrel 120; a fixed cam 122; a moving cam 124; and a cam spring 126. The assembled components of primary hinge subassembly 112 are also shown in cross-section in FIG. 5. Fixed hinge barrel 118 is attached to optics pod 102 of optics arm 100. Rotating hinge barrel 120 is positioned within fixed hinge barrel 118 and is attached to optics temple 104 of optics arm 100. Fixed cam 122 is seated adjacent bottom portion 118A of fixed hinge barrel 118. Moving cam 124 overlies fixed cam 122 and is biased towards fixed cam 122 by cam spring 126. Rotating hinge barrel 120 can move about fixed hinge barrel 118 and central shaft screw 115 to permit rotation of optics temple 104 of optics arm 100 relative to optics pod 102. Additionally, when optics arm 100 is attached to eyewear, such as a modified eyeglass frame, optics arm 100 can move relative to the eyewear.

With reference back to FIG. 4, connector subassembly 114 of hinge and connector assembly 106 is an example subassembly that can be used to interconnect optics arm 100 to desired eyewear, such as modified eyeglass frame 200. In one example, connector subassembly 114 includes a hinge stop/detent shelf 128, detent spring 130, detent 132, and bayonet 134.

Figure 6A:
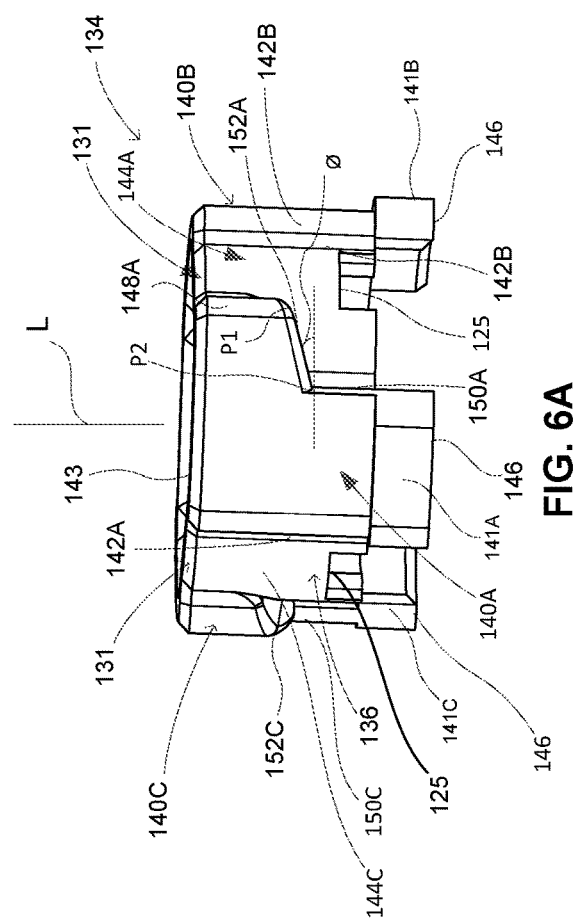
FIGS. 6A and 6B are respective front and top views of an example component of the example hinge and connector assembly shown in FIG. 4, in accordance with aspects of the disclosure.
Figure 6B:
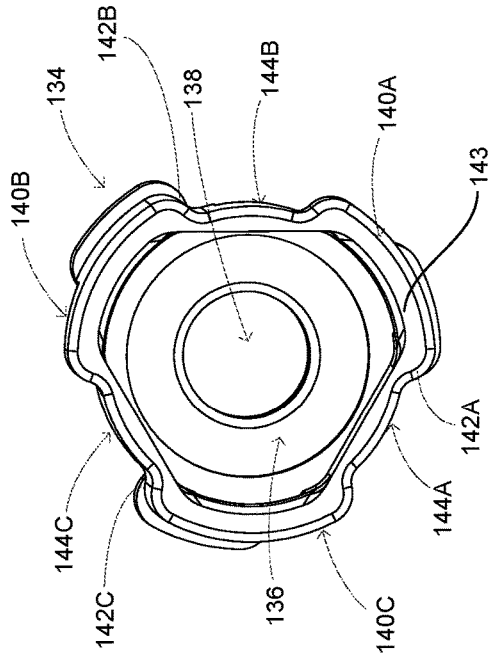

Bayonet 134 is an example component of connector subassembly 114 that can physically connect optics arm 100 to eyewear, including a band or eyeglass frame. In this example, as seen more clearly in FIGS. 6A-6B, main body 136 of bayonet 134 is round with a central opening 138 extending therethrough. Three identical legs 140A,140B, 140C, equally spaced around the circumference of bayonet 134, extend outwardly away from main body 136 in a direction perpendicular to the longitudinal axis L. Legs 140A,140B,140C further include feet 141A,141B,141C that will be positioned within fixed hinge barrel. As best shown in FIGS. 6A-6B, legs 140A,140B,140C are generally L-shaped and have elongated side edges 142A,142B,142C extending from top edge 143 of each of the legs of bayonet 134 to bottom edge 146 of feet 141A,141B,141C.

Referring to FIG. 6A, leg 140A of bayonet 134 includes a first opposed edge 148A that extends from a top edge 143 of leg 140A to a first point P1 between top and bottom edges 143,146. Second opposed edge 150A of leg 140A extends from bottom edge 146 to a second point P2 positioned between top edge 143 and bottom edge 146. First opposed edge 148A is spaced further away from respective elongated side edge 142A than second opposed edge 150A. Ramp edge 152A joins first opposed edge 148A to a second opposed edge 150A. Ramp edge 152A forms an angle Ø relative to a plane parallel to bottom edge 146. In one embodiment, Ø may be approximately 10 degrees, but in other embodiments, Ø may range between 0 degrees and 40 degrees. In still other examples, Ø may be greater than 40 degrees. It is to be appreciated that each leg 140A,140B,140C of bayonet 134 includes identical features but, for ease of discussion, reference is only made to leg 140A. For example, as also shown in FIG. 6A, leg 140C includes ramp 152C, and leg 140B includes a ramp edge not shown.

Recesses 144A,144B,144C of bayonet 134 are best illustrated in FIGS. 6A and 6B. Recesses 144A,144B may be positioned between each of legs 140A,140B,140C. For example, recess 144A is positioned between leg 140A and leg 140C; recess 144B is positioned between leg 140A and leg 140B; and recess 144C is positioned between leg 140B and leg 140C. Respective openings 131 to each of the recesses 144A,144B,144C are provided at the top edge 143. In this example, one or more of recesses 144A,144B,144C form an L-shape that is complementary to the L-shape of legs 140A,140B,140C.

It is to be appreciated that bayonet 134 illustrates only one example of a component that can interlock or join with a connection component of eyewear. In other examples, bayonet may have more or fewer additional legs, or legs that are not evenly spaced apart. Bayonet may instead include grooves extending around the circumference of the bayonet. Thus, various alternative features may be incorporated into bayonet in accordance with aspects of the disclosure.

Figure 7:
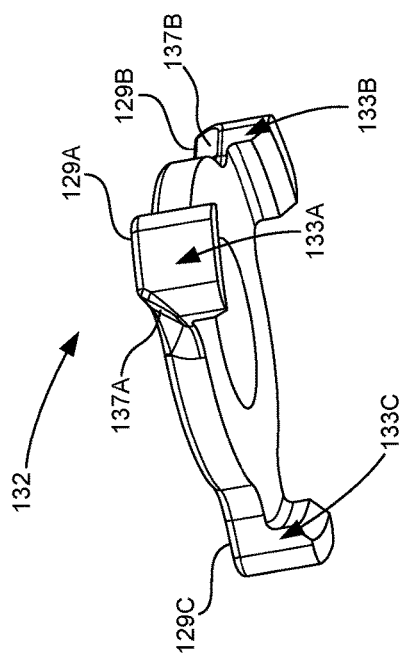
FIG. 7 is a perspective view of an example component of the example hinge and connector assembly shown in FIG. 4, in accordance with aspects of the disclosure.

With reference to FIG. 7, detent 132 is another example component of connector subassembly 114. In this example, detent 132 has an overall round shape that includes an opening to receive shaft screw 115. Three feet 133A,133B, 133C equally spaced around the circumference of detent 132 extend downward. As shown, each of detent feet 133A, 133B, 133C includes a top surface 129A,129B,129C. Each of the detent feet includes an angled side edge extending downward away from respective top surfaces 129A,129B, 129C. For example, detent foot 133A has an angled side edge 137A, detent foot 133B has an angled side edge 137B, and detent foot 133C has an angled side edge not shown in this view.

Figure 5:
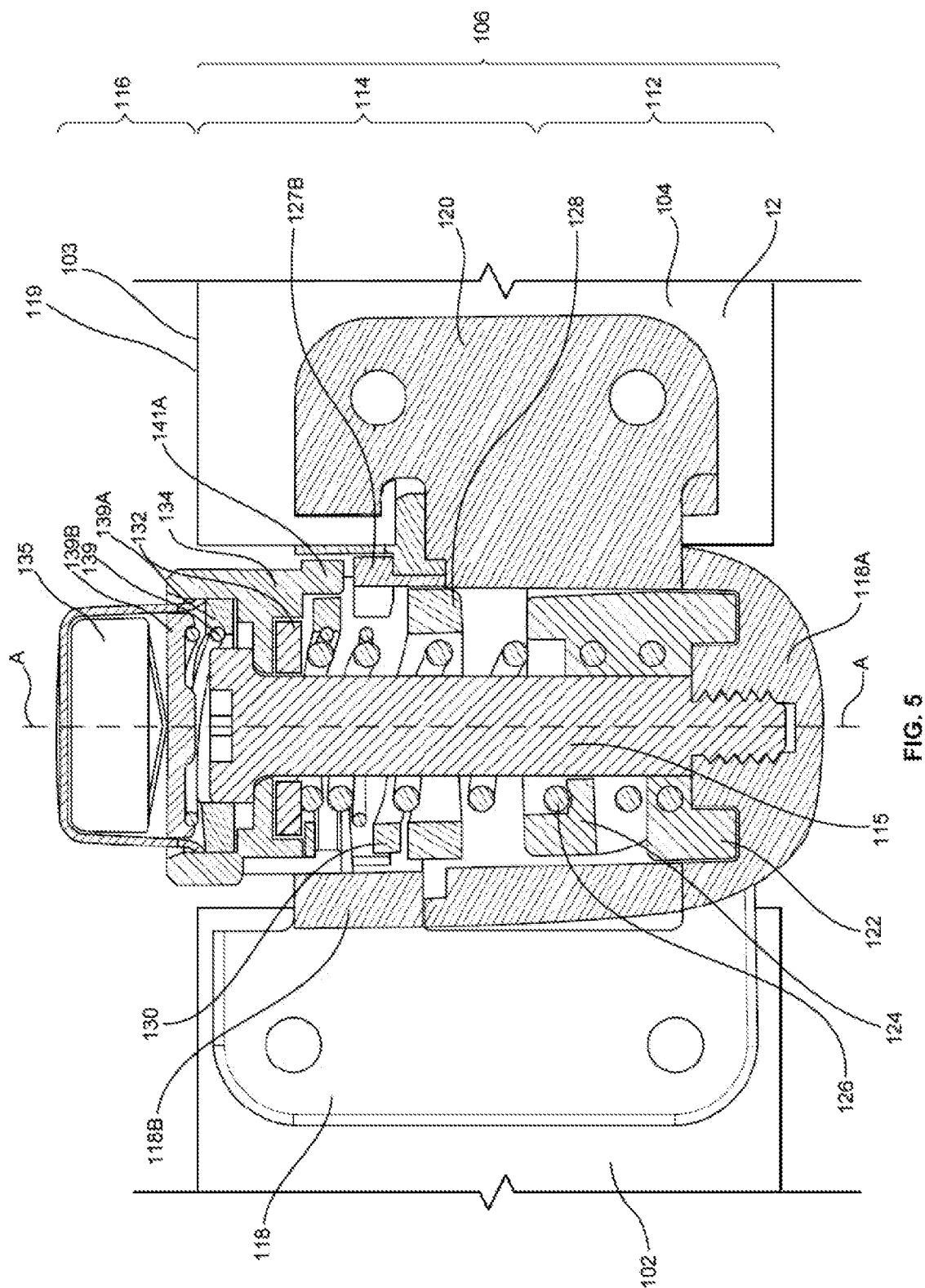
FIG. 5 is a cross-sectional front plan view of an example hinge and connector assembly of the component shown in FIG. 3.

Referring back to the cross-sectional view of FIG. 5, the assembled example components of connector subassembly 114 of hinge and connector assembly 106 are illustrated. In this example, connector subassembly 114 overlies primary hinge subassembly 112 and is axially aligned with primary hinge subassembly 112 along an axis A of shaft screw 115 that extends through the center of the screw, as well as an axis A that extends through the hinge and connector subassembly 114. In other examples, axis A may be offset from center screw or positioned elsewhere. As shown, hinge stop/detent shelf 128 is positioned within fixed hinge barrel 118 and rotating hinge barrel 120. Foot 127B of hinge stop/detent shelf 128, as well as feet 127A,127C (not shown), faces upward toward button 135 so that the circular body of hinge stop/detent shelf 128 can be positioned within recesses 117A of top portion 118B of fixed hinge barrel 118.

Detent spring 130 is positioned between detent 132 and hinge stop/detent shelf 128 and extends around central shaft screw 115. Detent spring 130 sits within recesses of hinge stop/detent shelf 128 and biases detent 132 toward bayonet 134. Bayonet 134 overlies detent 132, detent spring 130, and hinge stop/detent shelf 128. Foot 141B of bayonet 134 sits within corresponding recesses in fixed hinge barrel 118 and faces foot 127B of hinge stop/detent shelf 128. Similarly, feet 141B,141C (not shown) also face corresponding feet 127A,127C (not shown) of the hinge stop/detent shelf 128. Bayonet 134 is capable of moving along axis A of shaft screw 115 against the biasing force of detent spring 130. A portion of bayonet 134 is exposed and extends above fixed hinge barrel 118. In this example, bayonet 134 of optics arm 100 is exposed above surface 119 of the outer housing 103 of optics arm 102, so as to be capable of interlocking with eyewear, such as a frame or band, examples of which are further described herein.

Figure 8:
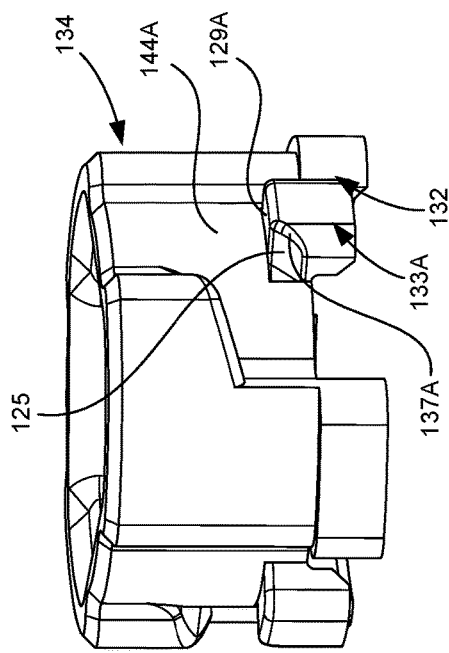
FIG. 8 is a perspective view of example components of FIGS. 6A and 7, assembled together.

Detent 132 overlies hinge stop/detent shelf 128 and fits inside of bayonet 134. Feet of detent 132 extend through corresponding openings in bayonet 134, so that the feet of bayonet 134 can be exposed through openings in detent 132. For example, as best seen in FIG. 8, a perspective view of only bayonet 134 and detent 132 joined together, top edges 129A of detent foot 133A are positioned within and exposed through bayonet opening 125. Top edge 129A and angled side edge 137A are therefore also exposed within recess 144A of bayonet 134. Each of the remaining feet 133B,133C of detent 132 is also exposed through identical openings in bayonet.

With reference back to FIG. 5, each subassembly of hinge and connector assembly 106 is aligned along the same axis A of shaft screw 115, such that connector subassembly 114 overlies primary hinge subassembly 112. It is to be appreciated that in other examples, one or more of the subassemblies or components of the subassemblies may instead be positioned elsewhere, such that one or more of the subassemblies are not aligned with one another. The order in which the subassemblies are arranged may also differ.

An image actuator assembly 116 can overlie hinge and connector assembly 106. As also shown in FIG. 5, image actuator assembly 116 includes a spring 139 biased toward a spacer 139A, as well as an interior button 139B and button 135. Image actuator assembly 116 is seated within bayonet 134 and is movable against the biasing force of spring 139, which overlies central shaft screw 115. Button 135 can communicate with electronics in optics arm 100, such as an imaging device (not shown) to initiate acquisition of an image, such as still or video images.

Figure 9:
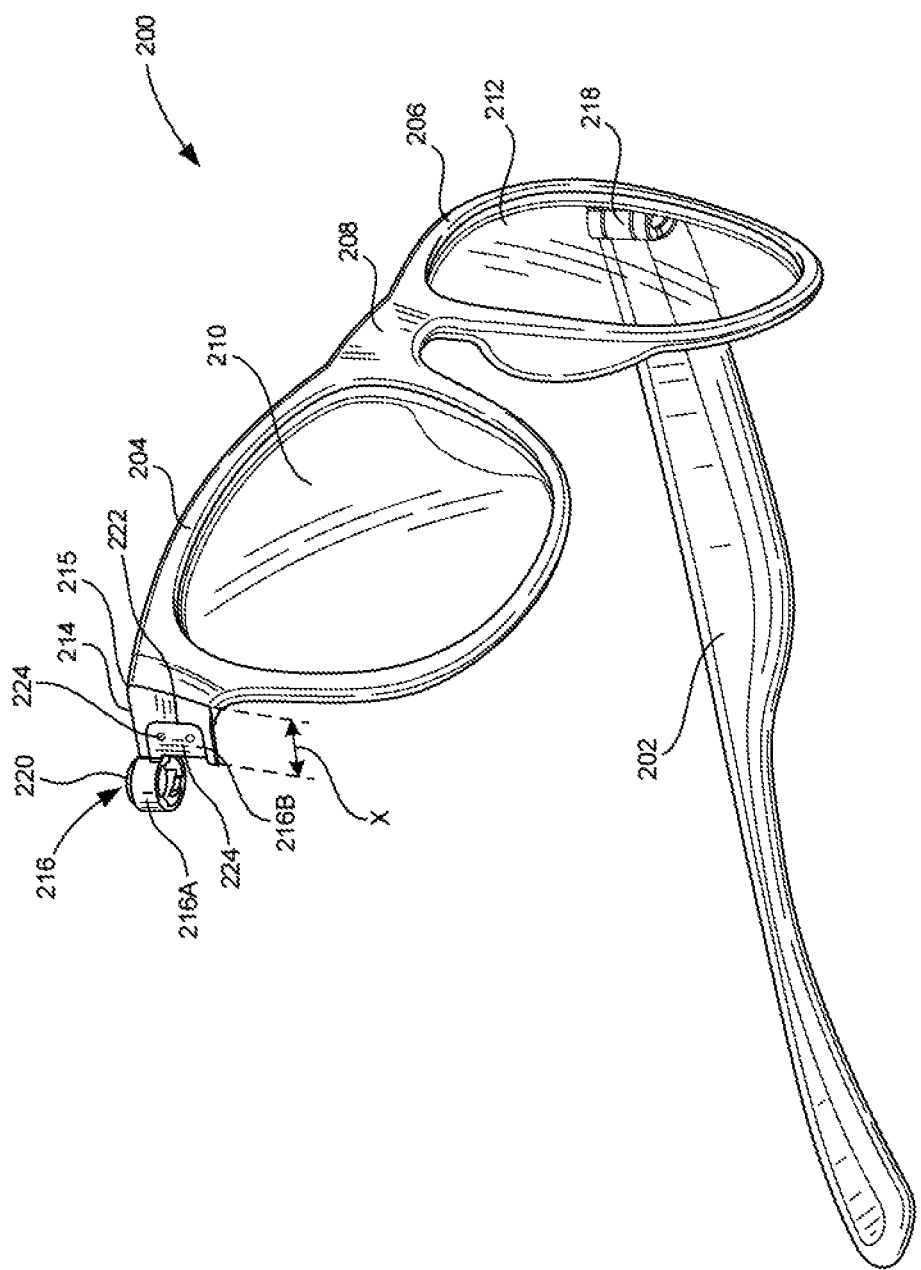
FIG. 9 is a perspective view of another example component of the interchangeable eyewear/head-mounted device assembly of FIG. 1, in accordance with aspects of the disclosure.

Turning to FIG. 9, an example of eyewear that can be joined with optics arm 100 to form head-mounted device 20 is shown. In this example, the eyewear is modified eyeglass frame 200, several of the components of which were discussed in more detail during the discussion of FIG. 1. As shown, modified eyeglass frame 200 includes only one extending side arm or frame arm 202 adjacent lens frame 206. For example, in place of a second extending side arm adjacent lens frame 204, there is a flange 214 and a connector 216 attached to the end of flange 214. Flange 214 extends a distance X away from lens frame 204 in a generally perpendicular direction. For example, flange 214 may extend a distance ranging approximately 2 mm away from lens frame 204. In other embodiments, distance X may range from 1-20 mm and in still other embodiments, distance X may be greater than 20 mm. This distance X away from frame 204 allows different types of frames to be utilized with the optics arm or other side arms, including wrapped frames. Flange 214 can also help to stabilize optics arm 100 (or any other devices) when attached to optics arm 100 and will also position the hinge and connector assembly of optics arm 100 a distance X away from lens frame 204. In other examples, connector 216 may be directly attached to outer edge 215 of central frame support 201, such that a flange is not required.

Connector 216 is used to secure modified eyeglass frame 200 to the optics arm. In this example, connector 216 is a generally rounded cap 216A integrally formed with an elongated tab body 216B. Tab body 216B is attached to flange 214 of modified eyeglass frame 200 so that tab body 216B has a surface that is flush with outer surface 222 of flange 214. In other embodiments, tab body 216B may instead be recessed or extend outwardly from surface 222 of flange 214. Tab body 216B of connector 216 can be attached to flange 214 in any manner. For example, connector 216 may be screwed into modified eyeglass frame 200. Screws 224 extend through flange 214 and tab body 216B to secure connector 216 to flange 214. In other embodiments, connector 216 may not include a tab body 216B and, instead, cap 216A can be directly connected or attached to modified eyeglass frame 200 using known methods.

Figure 10B:
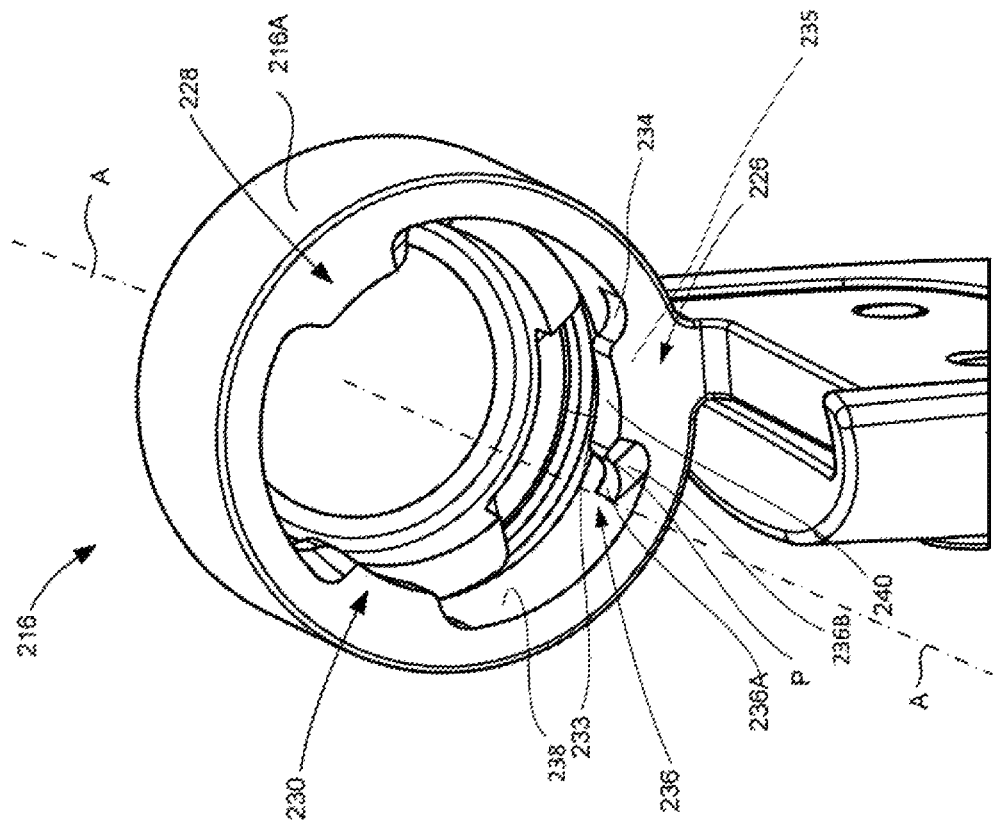
FIG. 10B is a perspective view of the example component of FIG. 9.
Figure 10A:
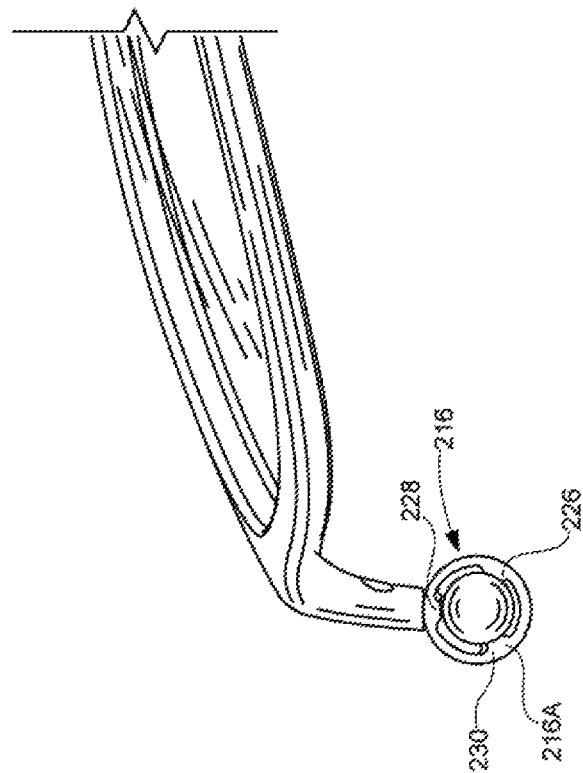
FIG. 10A is an enlarged bottom plan view of an example connector of the example component of FIG. 9.

Connector 216 includes features that can interlock with bayonet 134 of optics arm 100. For example, turning to FIG. 10A, three identical tabs 226,228,230 are evenly spaced around the circumference of cap 216A and can be used to interlock connector 216 with bayonet 134. For ease of discussion, tab 226 will be discussed, but it is to be appreciated that each of tabs 226,228,230 possesses the same features and alternative features. With reference to FIG. 10B, tab 226 is spaced away from top tab edge 233 of cap 216A. Tab 226 protrudes away from the circumferential inner edge 238 toward a central axis C of cap 216A to form a raised circumferential surface 240, as well as a top tab edge 233 and a bottom tab edge 235. A right tab edge 234 is formed between raised circumferential surface 240 and circumferential inner edge 238. Similarly, a left tab edge 236 is provided on an opposed end of raised circumferential surface 240. Left tab edge 236 is also convex and includes a first curved surface 236A and a second curved surface 236B. First curved surface 236A and second curved surface 236B meet to form a point P. It is to be appreciated that the structure of the tabs described herein can be modified based on a corresponding connecting structure of optics arm or other device. Other examples of connectors may also be utilized.

Figure 11A:
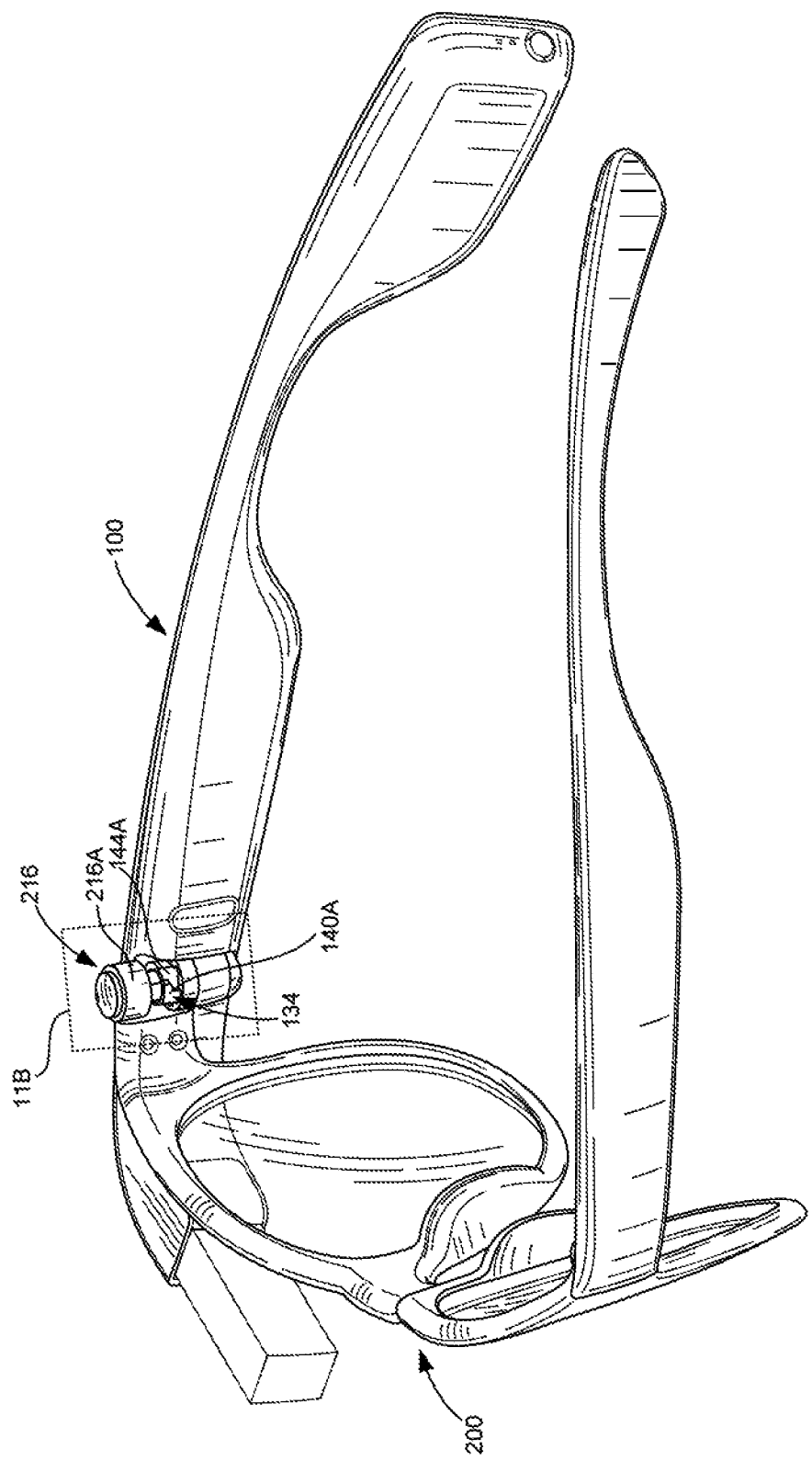
FIG. 11A is a perspective view of the interchangeable eyewear/head-mounted device assembly of FIG. 1, partially assembled.
Figure 11B:
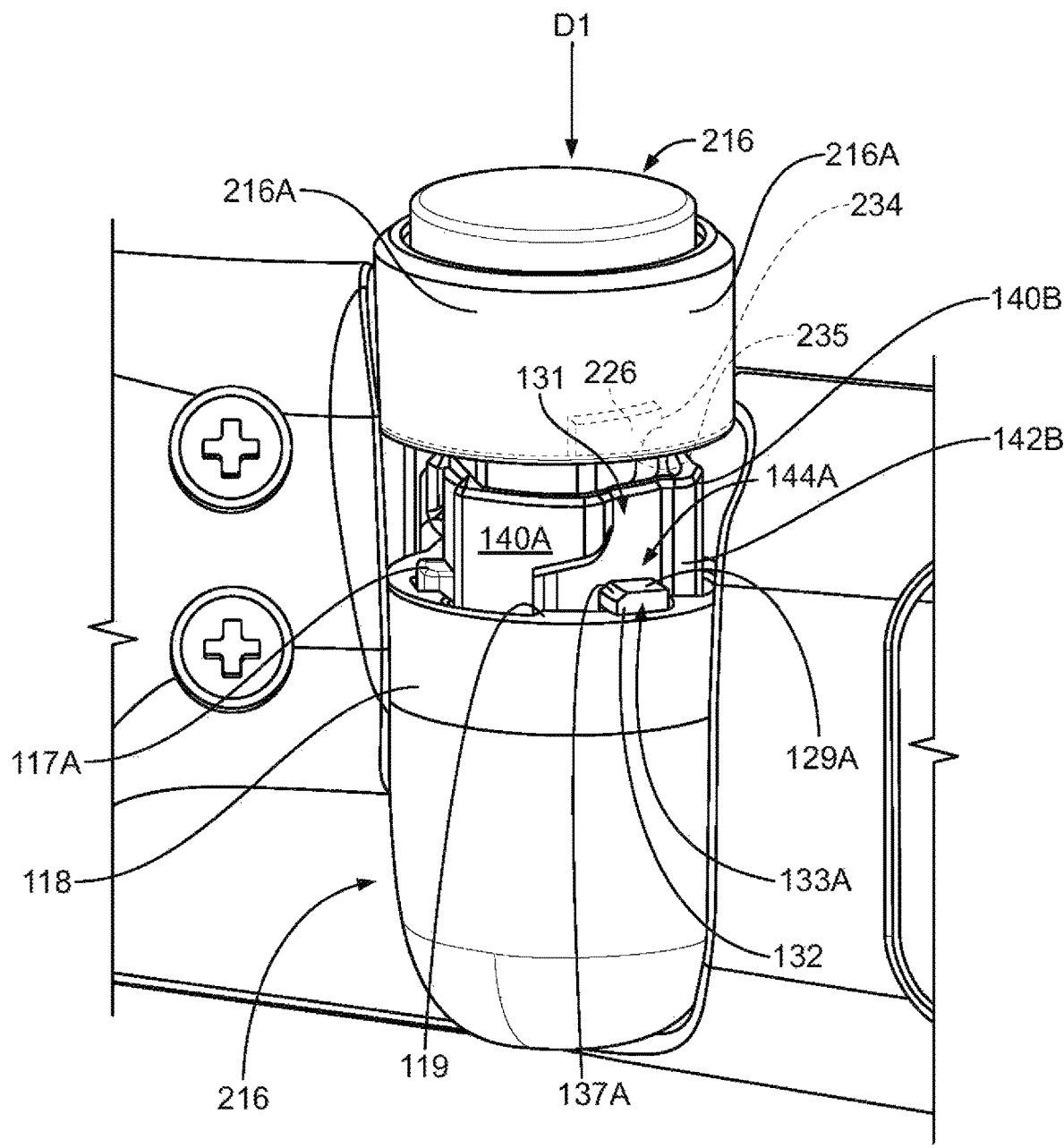
FIG. 11B is an enlarged view of a portion of FIG. 11A.

Turning to FIG. 11A, to join eyewear, such as modified eyeglass frame 200 with the optics arm 100, each of the tabs of connector 216 of modified eyeglass frame 200 may be interlocked with bayonet 134 of hinge and connector assembly 106 of optics arm 100. In this example, the tabs on cap 216A of connector 216 must first be aligned with openings 131 to recesses 144A,144B,144C positioned between each of legs 140A,140B,140C of bayonet 134. A user may rotate or move modified eyeglass frame 200 into a position where tabs 226,228,230 overlie openings 131 in corresponding recesses 144A,144B,144C of bayonet 134. For example, FIG. 11B shows alignment of one of the tabs 226 of connector 216 with openings 131 to recesses of bayonet 134. In other embodiments where cap 216A is not fixed, cap 216A may instead be rotatable relative to lens frame 204, such that the entire modified eyeglass frame 200 does not need to be rotated relative to optics arm 100.

When each of the tabs 226,228,230 of connector 216 is aligned with recesses of bayonet 134, optics arm 100 and modified eyeglass frame 200 can be joined together. As best seen in FIG. 11B, cap 216A of modified eyeglass frame 200 is being pushed in a direction D1 towards the hinge and connector assembly 106 of optics arm 100. Referring first to tab 226 and recess 144A, tab 226 will enter opening 131 of recess 144A. Cap 216A is pushed down into corresponding recess 144A until bottom tab surface or edge 235 of tab 226 contacts top surface 129A of detent foot 133A of detent 132. The interior raised circumferential surface (not shown in this view) of tab 226 complements the curved or rounded surfaces of recess 144A, thereby allowing tab 226 to slide down into respective recess 144A. Edge 142B of adjacent leg 140B guides tab 226 into recess 144A and prevents rotation of cap 216A beyond side edge 142B. Although not shown, tabs 228,230 are also simultaneously guided through respective openings 131 into corresponding recesses 144B, 144C when cap 216A is pushed down toward hinge and connector assembly 106. Edges 142C,142A of legs 140C, 140A will guide respective tabs 228,230 into recesses 144B, 144C.

Figure 12:
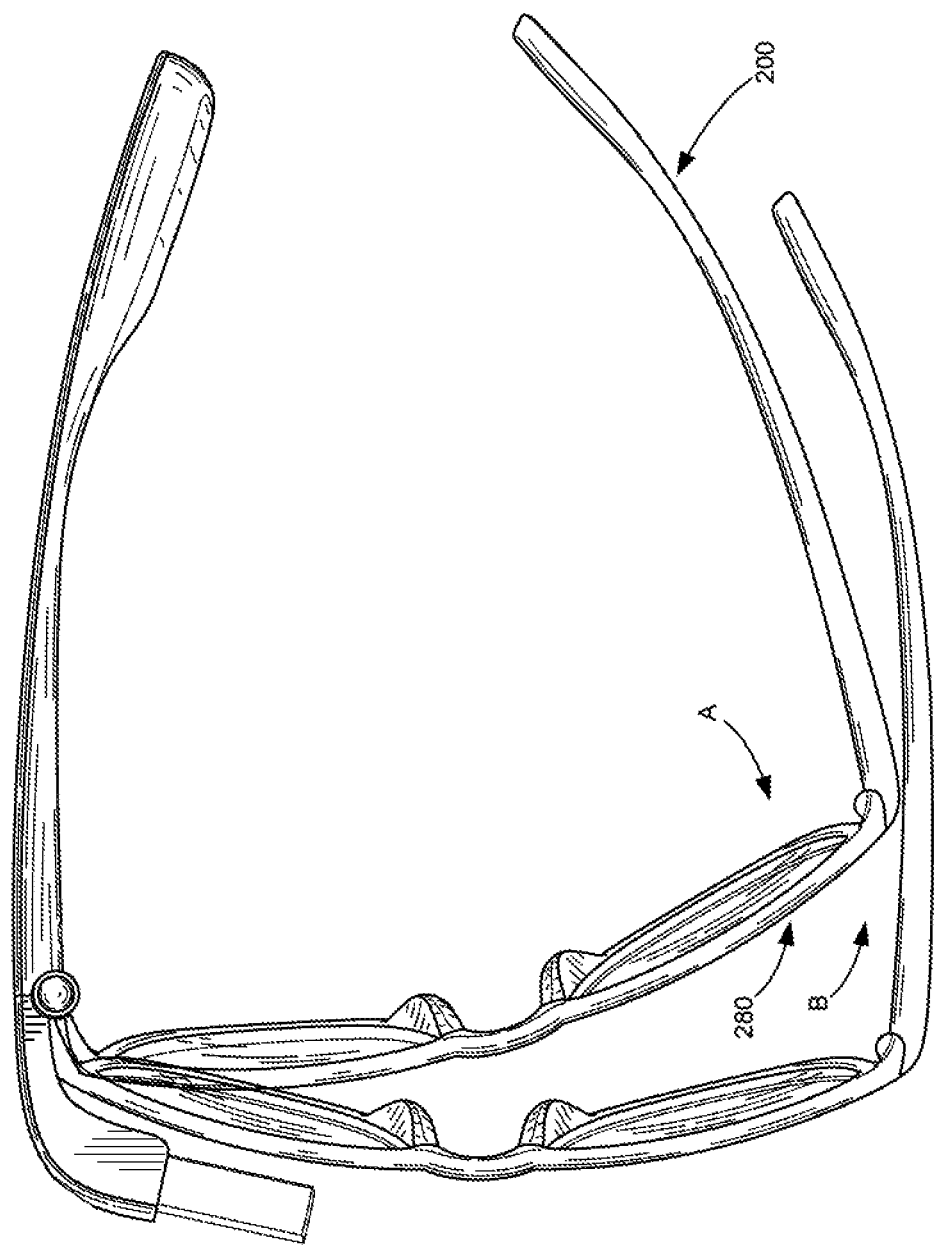
FIG. 12 is a top plan view illustrating an example schematic of the assembly and disassembly of the components of the interchangeable eyewear/head-mounted device assembly of FIG. 1.

In order to interlock connector 216 with bayonet 134, at least one of connector 216 and bayonet 134 must move relative to the other. For example, connector 216 may be twisted or rotated relative to bayonet 134. In this example, as shown in FIG. 12, once the tabs of connector 216 are positioned within the recesses, modified eyeglass frame is in a first rotated position 280. Modified eyeglass frame 200 may then be rotated in a clockwise direction A so that each of the tabs of connector 216 can be interlocked with each of the legs of bayonet 134. Modified eyeglass frame 200 may be rotated approximately 30° about bayonet 134 but, in other embodiments, the degree of rotation may vary. For example, the degree of rotation can be greater or less than 30°, depending on the desired design. In other examples, bayonet 134 and corresponding tabs 226,228,230 on connector 216 may be constructed such that a user may rotate the modified eyeglass frame 200 in the opposite or counter-clockwise direction to assemble components of head-mounted device 20.

Figure 13:
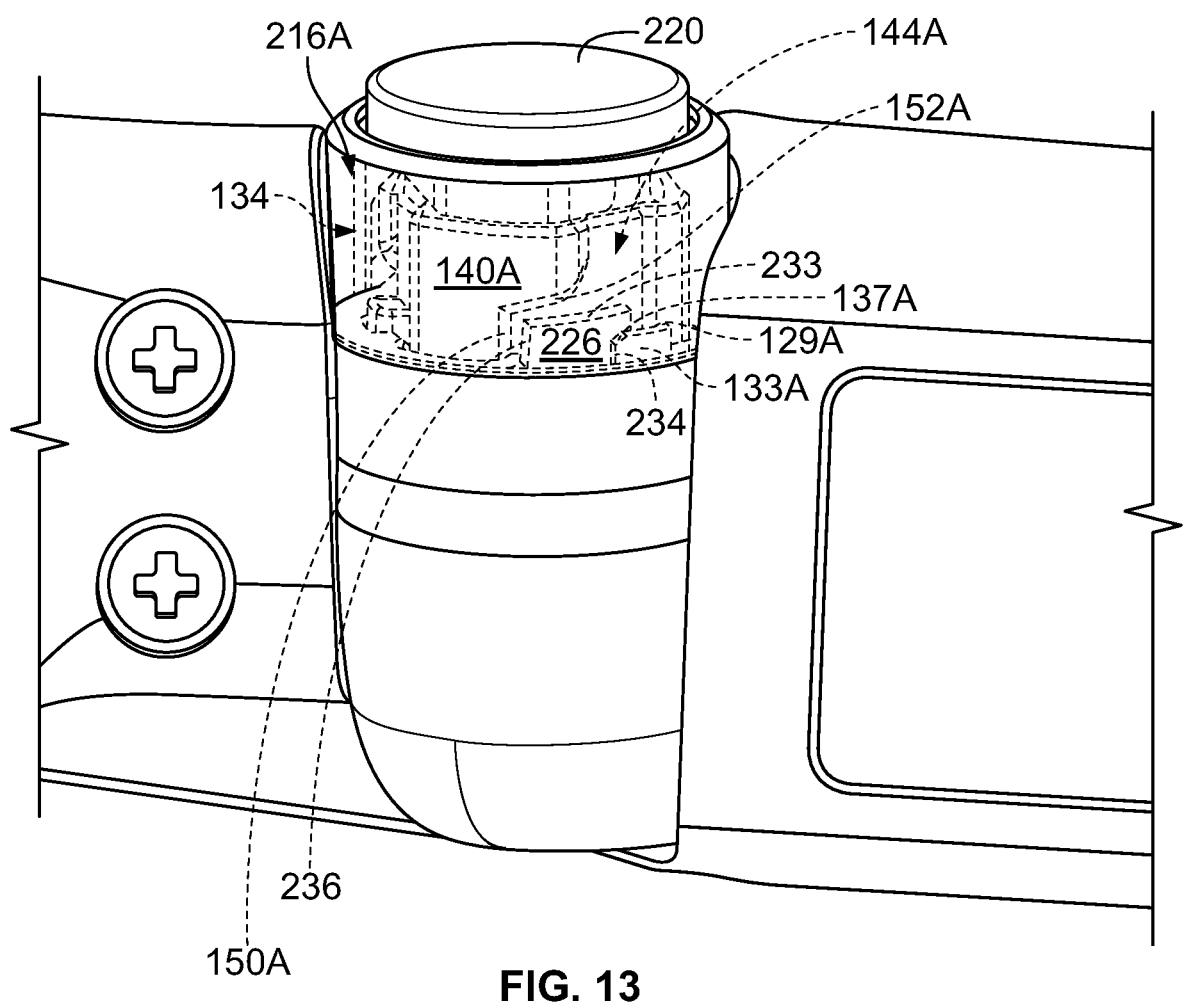
FIG. 13 is an enlarged perspective view of a portion of FIG. 1, illustrating interior components of the example hinge and connector assembly.

When modified eyeglass frame 200 is rotated, each of the tabs of connector 216 interlock with legs of bayonet 134. For example, with reference to FIG. 13, which illustrates one of the tabs 226 interlocked with leg 140A, top tab edge 233 will move along ramp edge 152A of bayonet 134 and angled side edge 137A of detent foot 133A. Tabs 228,230 will also interlock with corresponding legs 140B,140C (not shown). Angled side edge 137A of detent foot 133A can have a surface complementary to right tab edge 234 of tab 226. Tab 226 can be moved until left tab edge 236 of tab 226 is positioned between second opposed edge 150A of leg 140A of bayonet 134 and angled side surface 137A of detent 132. Detent spring 130 will bias bayonet 134 and tabs 226,228, 230 of connector 216 together to ensure modified eyeglass frame 200 and optics arm 100 are secured together.

Referring back to FIG. 12, the components of head-mounted device 20 can be quickly and easily disassembled without the use of external tools by moving eyewear, such as modified eyeglass frame 200, in the opposite direction of assembly. For example, a user can hold optics arm 100 by grasping a portion of optics pod 102, as well as optics temple 104, with one hand. A user may then hold modified eyeglass frame 200 with the other hand and rotate modified eyeglass frame 200 and connector 216 in direction B or in a counter-clockwise direction relative to optics arm 100. In this example, modified eyeglass frame is rotated approximately 30° but, in other examples, the degree of rotation may be less or greater. Rotation of modified eyeglass frame 200 causes tabs 226,228,230 to be disengaged with legs 140A,140B, 140C of bayonet 134 of optics arm 100 and realigned with openings 131 to each of recesses 144A,144B,144C. In other examples, the tab and bayonet may be constructed such that a user may rotate the modified eyeglass frame 200 in an opposite or clockwise direction to disassemble components of the head-mounted device.

It is to be appreciated that in other examples, bayonet 134 may be provided on modified eyeglass frame 200, and corresponding interlocking connectors may be provided on optics arm 100. Additionally, bayonet 134 and connector subassembly 114 of optics arm 100 and connector 216 of modified eyeglass frame 200 present only one mechanism for joining components of headwear assembly together. In other examples, different connection mechanisms can be used to join components of the assembly together. For example, connector 216 and optics arm 100 may include magnets that can be joined together with or without requiring further rotation of the modified eyeglass frame 200 and optics arm 100 relative to one another. In still another example, a separate component that is positioned between optics arm 100 and modified eyeglass frame 200 can be used to join these components together.

Figure 14:
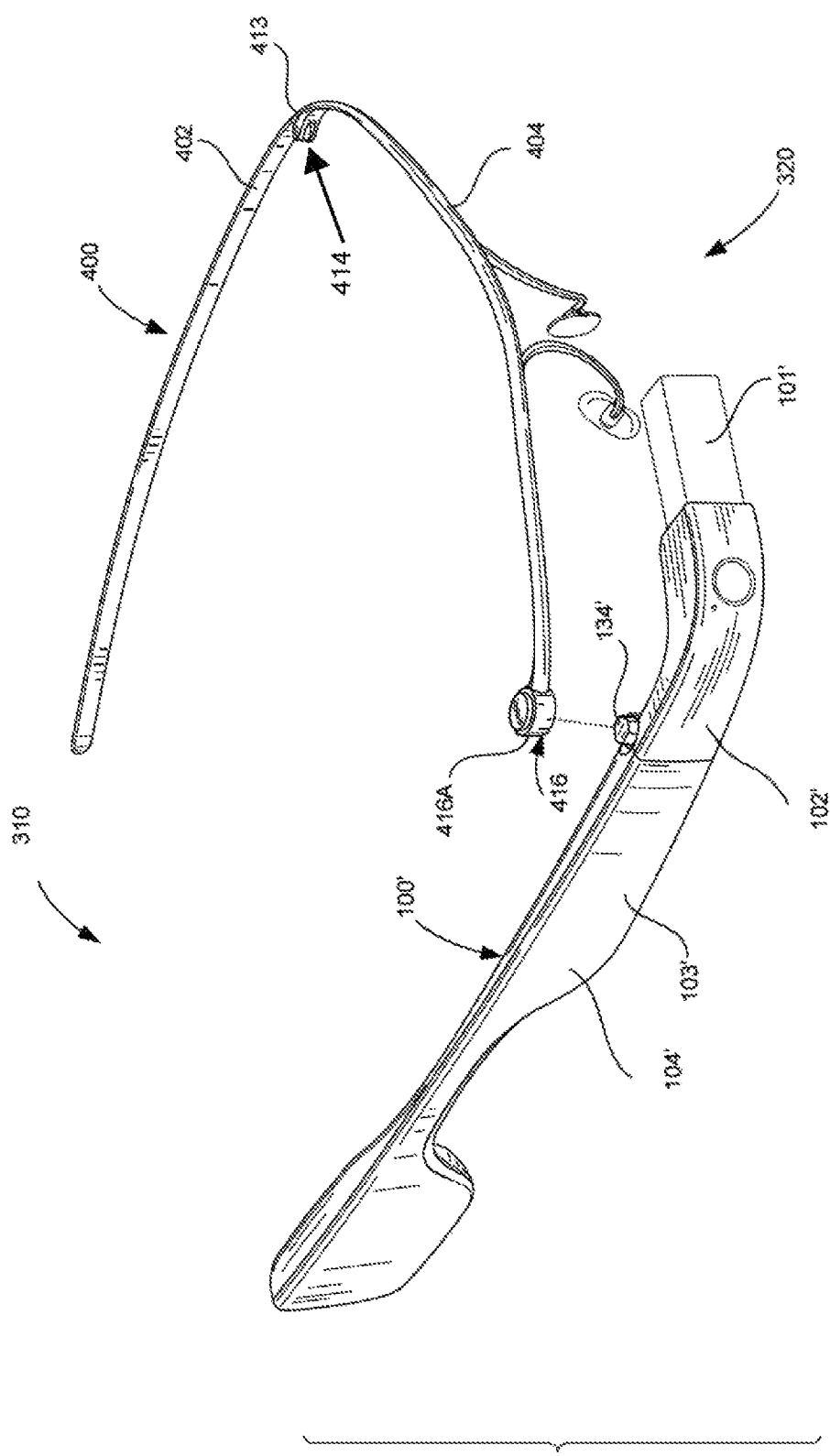
FIG. 14 is a perspective view of disassembled components of another interchangeable eyewear/head-mounted device assembly, in accordance with aspects of the disclosure.

Turning now to FIG. 14, another example of eyewear that can be connected with optics arm 100 is shown with an exploded view of an example head-mounted device 320. In this example, the eyewear is a band 400, which can be joined to optics arm 100' to form a head-mounted device 320. Band 400 is generally J-shaped and includes a frame arm 402 hingedly connected to front end 413 of central or front frame support 404. Frame arm 402 can freely move between an open position and a closed or folded position when frame arm 402 is moved relative to front frame support 404 about hinge 414. In another example, frame arm 402 may be fixed to front frame support 404 such that frame arm 402 is incapable of moving relative to front frame support. In such example, band 400 is a continuous unitary component. In another example, frame arm 402 may be separated from front frame support 404. Band 400 does not further include lens frames or lenses, but in other examples, band 400 can further include lenses or frames that can be clipped or attached to band 400.

Figure 15:
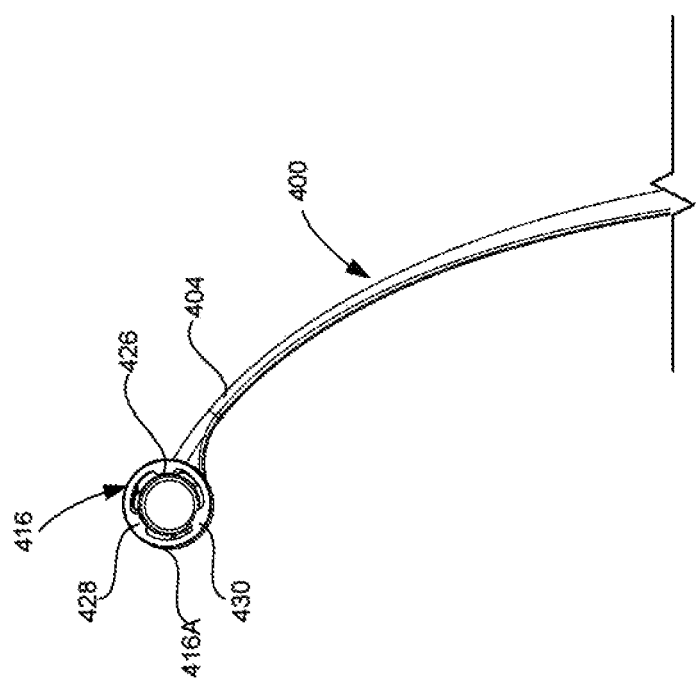
FIG. 15 is an enlarged bottom plan view of a portion of an example component shown in FIG. 14.

With reference to FIG. 15, a connector mechanism may be provided to connect band 400 to another component of the eyewear/head-mounted device assembly. For example, connector 416 of band 400 is positioned at one end of front frame support 404. Connector 416 is comprised of cap 416A that is identical to the structure of cap 216A, discussed with regard to FIGS. 10A-10B, and includes all of the same features of optics arm 100, including the features of the hinge and connector assembly 106', as well as the same alternative features. Identical reference numerals will therefore be used to describe similar features. Like connector 216 in FIGS. 10A-10B, connector 416 includes three tabs 426, 428,430 equally spaced around the inner circumference of cap 416A and each having the same features and alternative features previously discussed herein. In this example, connector 416 is fixed to front frame support 404 and does not move relative to front frame support 404. For example, connector 416 may be welded to band 400 or an adhesive or other device may be used to secure connector 416 to front frame support 404. In other examples, connector 216 may be movable or removable relative to band 400.

Figure 16:
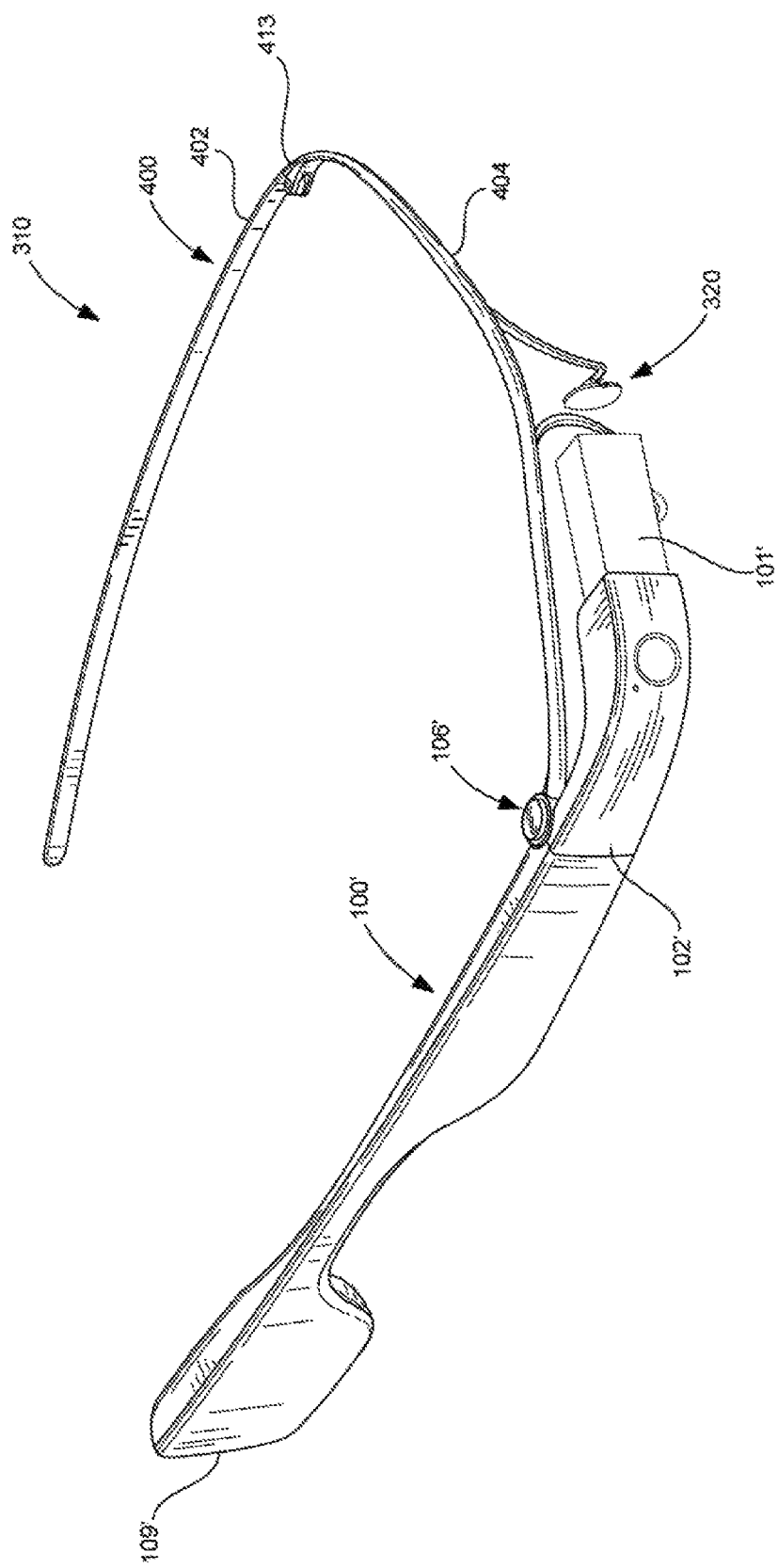
FIG. 16 is a perspective view of the assembled components of the interchangeable eyewear/head-mounted device assembly of FIG. 14.

Connector 416 of band 400 can connect with optics arm 100' to join optics arm 100' and band 400 together. Optics arm 100' is identical to optics arm 100, discussed with regard to FIGS. 1-13, and includes all of the same features of optics arm 100, including the features of hinge and connector assembly 106', as well as the same alternative features. To facilitate discussion, similar reference numerals will be used to describe similar features. Since the features of connector 416 are identical to connector 216, connector 416 will join with optics arm 100' in the same way it is described with regard to FIGS. 1-13. For example, tabs 426,428,430 on cap 416A of connector 416 will interlock with bayonet 134' of optics arm 100'. The assembled optics arm 100' and band 400 are illustrated in FIG. 16. Another example of an interchangeable eyewear/head-mounted device assembly 310 is shown in the form of a head-mounted device 320.

Turning now to FIG. 17A, a disassembled modular eyewear/head-mounted device assembly 510, in accordance with aspects of the disclosure, is shown. In this example, a side arm or removable temple arm 600 can be used with modified eyeglass frame 200' to form interchangeable eyewear/head-mounted device assembly 510. Modified eyeglass frame 200' is identical to modified eyeglass frame 200, previously discussed herein, and similar reference numerals will be used to discuss similar features. For example, as best shown in FIG. 17B, modified eyeglass frame 200' includes a connector 216' with tabs 226',228',230', which can be joined together with removable temple arm 600.

In this example, removable temple arm 600 can be substituted in place of the optics arm 100, previously discussed herein, and joined with eyewear. This may occur, for example, when a user no longer desires to wear a head-mounted device, such as head-mounted device 20, previously discussed herein, but desires to continue using the eyewear, such as modified eyeglass frame 200'. In such example, removable temple arm 600 can provide a user with the ability to switch back and forth between using eyewear, such as modified eyeglass frame 200', as part of a head-mounted device, or as a pair of eyeglasses.

Figure 18A:
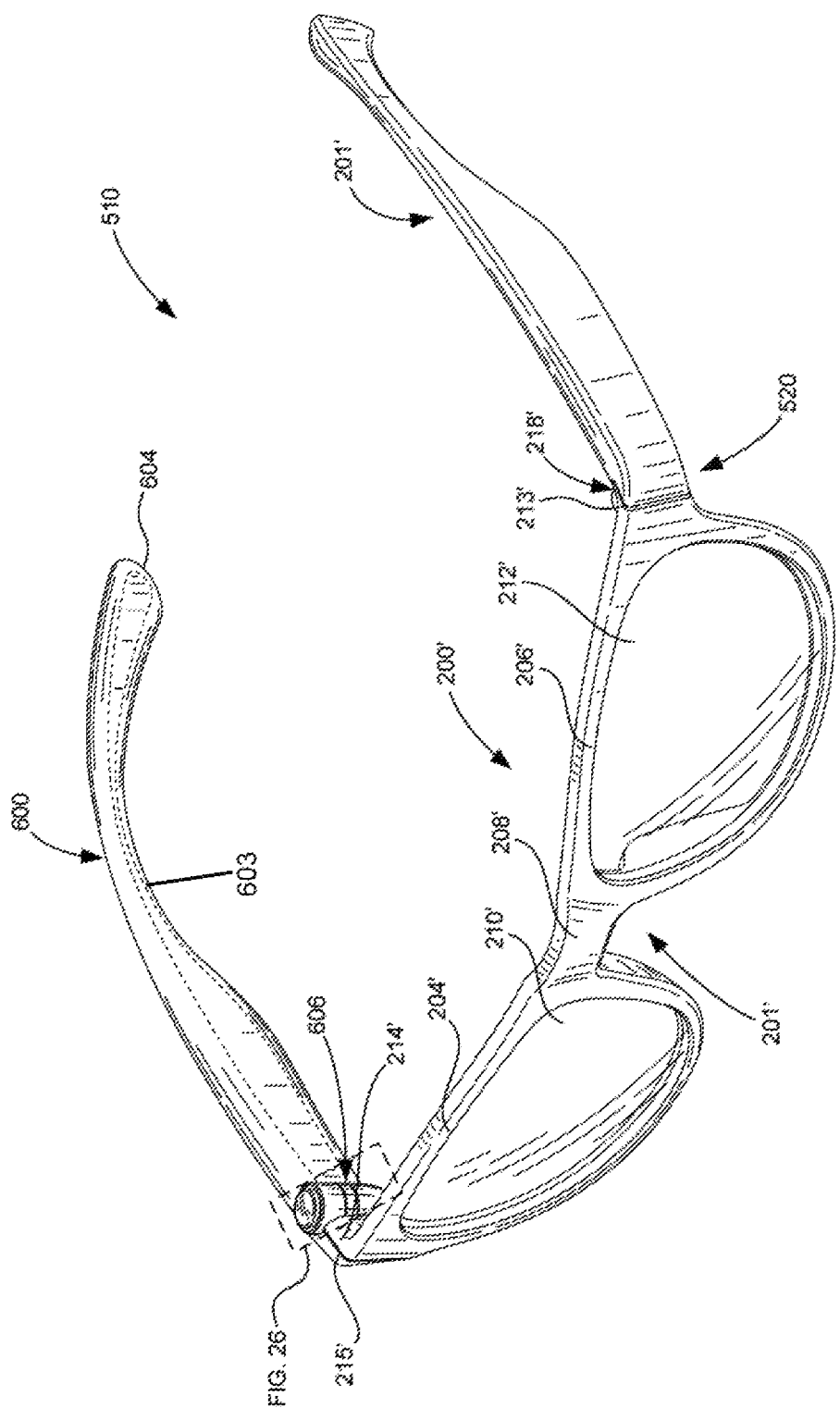
FIG. 18A is a perspective view of the assembled interchangeable eyewear/head-mounted device of FIG. 17A.

When joined together, as shown in FIG. 18A, the components of interchangeable eyewear/head-mounted device assembly 510 form a pair of eyeglasses 520 that can be worn by a user. Eyeglasses 520 include lens frames 204',206', middle frame support 208', and lens elements 210',212'. The combination of lens frames 204',206' and middle frame support 208' forms a central frame support 201'. Side arms extend away from lens frames 204',206'. For example, first side arm or frame arm 202' extends away from lens frame 206' and a second side arm or the removable temple arm 600 extends away from lens frame 204'.

Figure 18B:
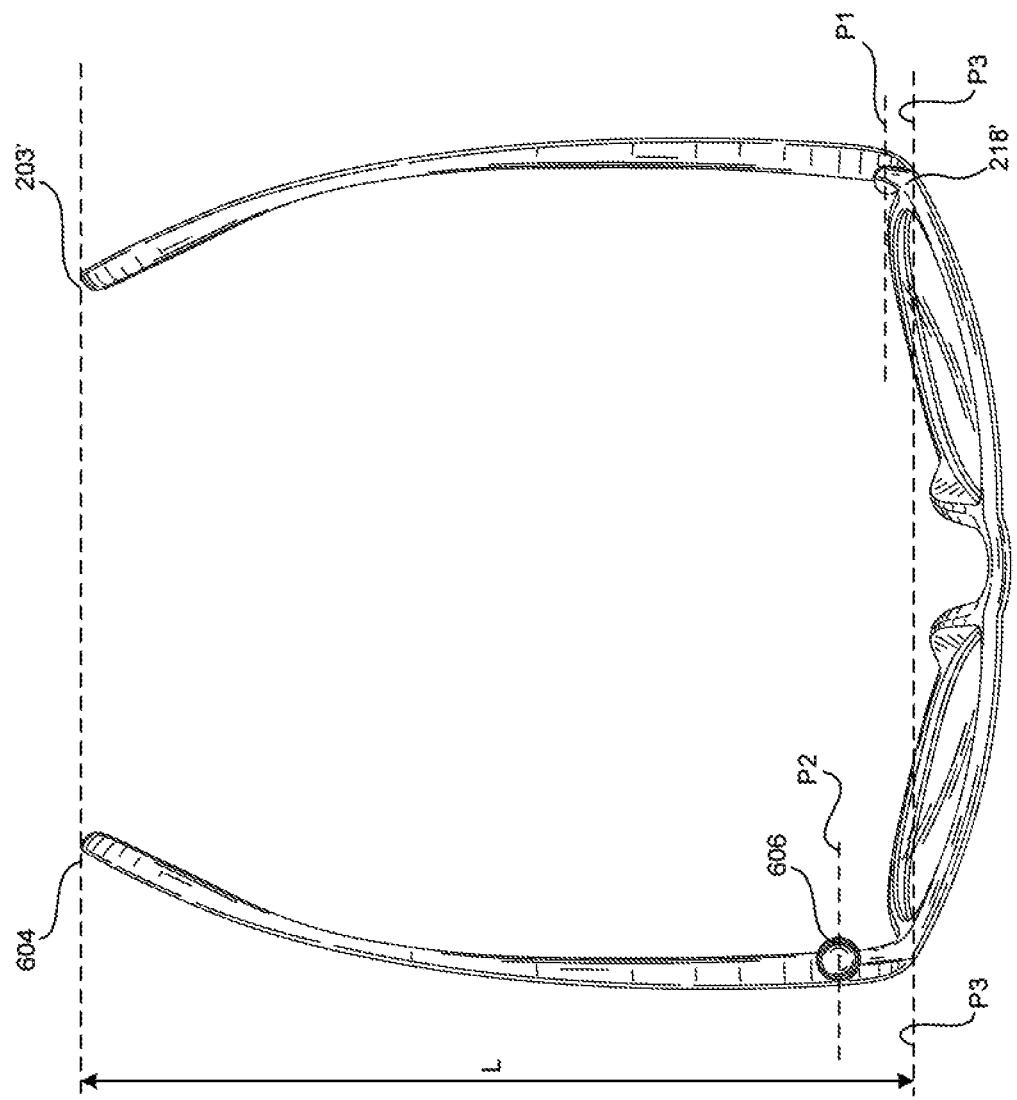
FIG. 18B is a top plan view of the interchangeable eyewear/head-mounted assembly of FIG. 18A.

With reference to FIG. 18B, removable temple arm 600, frame arm 202', lens frames 204',206', and central frame support 201' form a U-shaped structure. As shown, free end 604 of removable temple arm 600 and free end 203' of frame arm 202' extend approximately the same length L away from respective lens frames 204',206'. As also shown, hinge 218' and hinge and connector assembly 606 are not positioned the same or similar distance away from respective lens frames 204',206'. As shown, hinge 218' is positioned in plane P1 and hinge and connector assembly 606 is positioned in plane P2, which is a plane parallel to plane P1. Both planes P1,P2 are parallel to plane P3, along which outer edge 215' and opposed outer edge 213' of central frame support 201' extends. Hinge 218' is positioned at or directly adjacent the outermost front edge 213' of central frame support 201', whereas hinge and connector assembly 606 is offset and spaced away from opposed edge 215' of central frame support 201' by flange 214'.

Figure 18C:
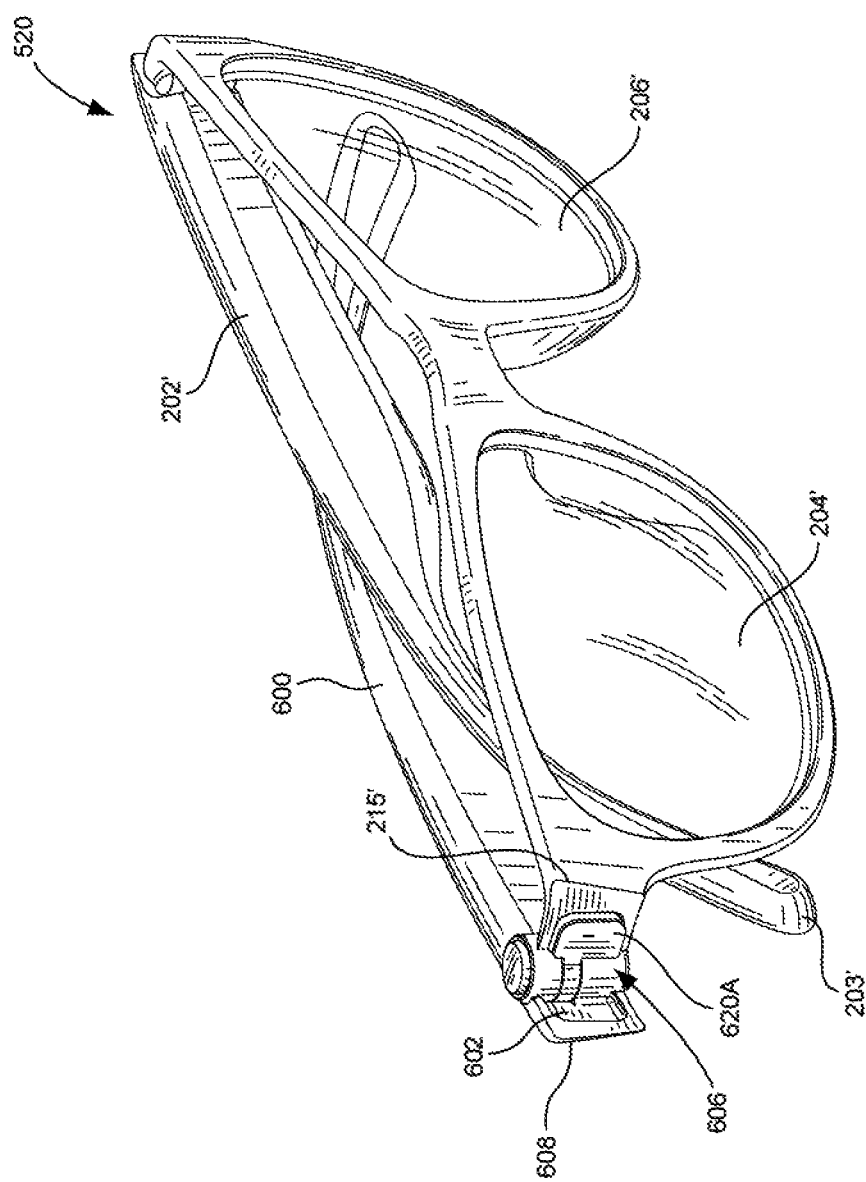
FIG. 18C is a front perspective view of the interchangeable eyewear/head-mounted device of FIG. 18A in a folded position.

Frame arm 202' and removable temple arm 600 move about respective hinge 218' and hinge and connector assembly 606 from an open or extended position to a folded position. As shown in FIG. 18C, frame arm 202' can be folded first so that free end 203' of frame arm 202' extends downward and is closest to lens frames 204,206' in the folded position. Removable temple arm 600 folds over frame arm 202' and is spaced further away from lens frames 204',206'. Frame arm 202' and removable temple arm 600 are generally parallel to lens frames 204',206 in the folded position.

With reference still to FIG. 18C, when folded, an angled edge 608 of removable temple arm 600 extends past front edge 215' of central frame support 201', as well as flange 214' of modified eyeglass frame 200'. Hinge and connector assembly 606 is exposed, including pull tab 620A. A recess 602 in removable temple arm 600 is also exposed and sized to receive the shape of pull tab 620A when removable temple arm 600 is expanded into an open position.

FIG. 19A illustrates one example of removable temple arm 600 of eyeglasses 520. As shown, removable temple arm 600 has an elongated body that tapers at free end 604. At its opposed front end 605, removable temple arm 600 has an angled edge that will be flush with an edge of eyewear to which removable temple arm 600 can be affixed. Removable temple arm 600 includes a hinge and connector assembly 606, which will be discussed in more detail herein, with at least a portion of bayonet 634 exposed. Removable temple arm 600 may be a substantially solid structure or a hollow structure formed from the same material as modified eyeglass frame 200', such as plastic.

Removable temple arm 600 includes a pull tab 620A. When pull tab 620A is moved in direction A away from removable temple arm 600, as shown in FIG. 19B, tab 620A is displaced from a first position within recess 646 of removable temple arm 600 into a second position, thereby causing movement of both pull tab 620A and bayonet 634. Pull tab 620A can be moved in direction B when it is desired to return pull tab 620A back into its original position. Side 617B of pull tab 620A is flat and is flush with inner surface 646A of recess 646.

Hinge and connector assembly 606 of removable temple arm 600 is similar to the hinge and connector assembly 106 previously described herein. Hinge and connector assembly 606 can permit movement of removable temple arm 600 relative to eyewear, such as lens frame 204' of modified eyeglass frame 200'. Hinge and connector assembly 606 also enables eyewear, such as modified eyeglass frame 200', to interlock with removable temple arm 600 without the need for external tools.

Figure 20:
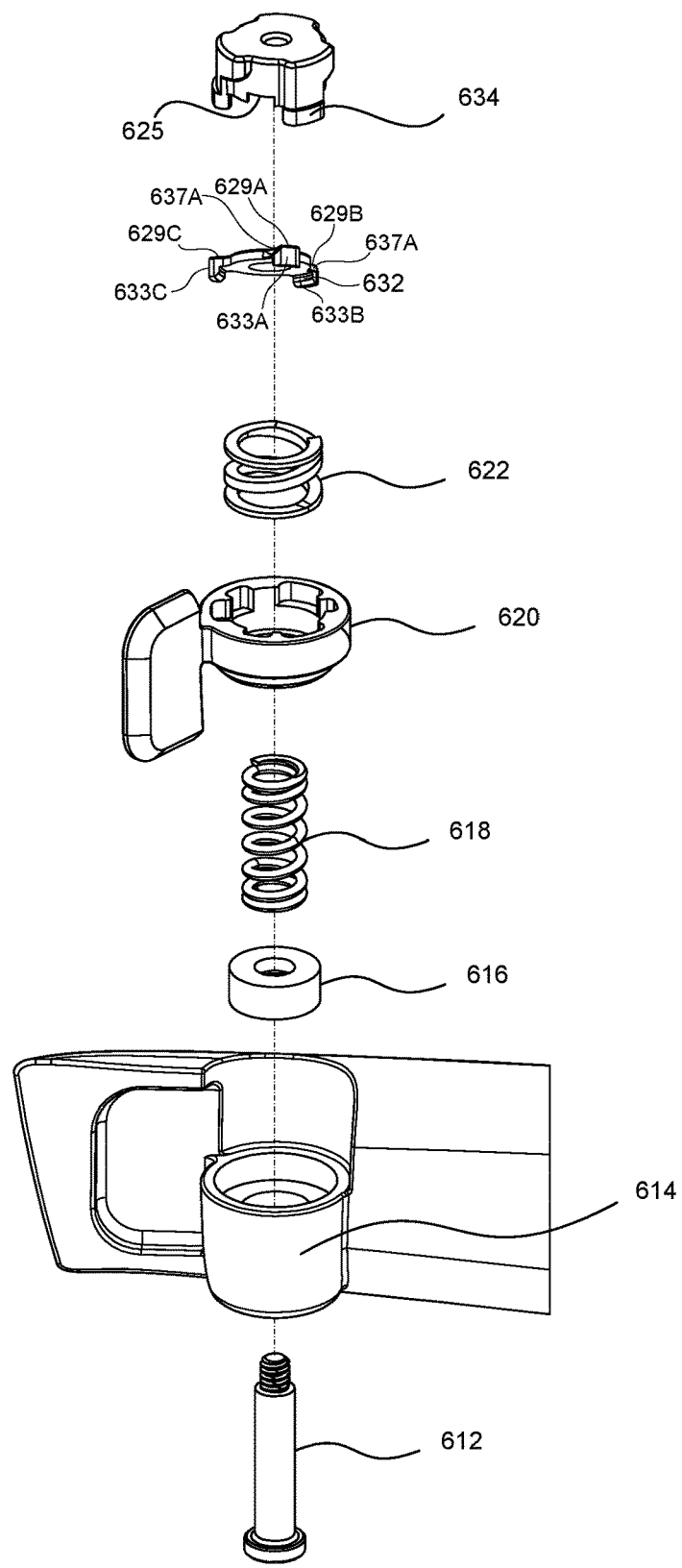
FIG. 20 is an exploded view of an example hinge and connector assembly of the component shown in FIG. 19A.

FIG. 20 is an exploded view of hinge and connector assembly 606 of removable temple arm 600. For example, hinge and connector assembly 606 includes central shaft screw 612, bushing 616, spring 618, hinge lock 620, detent spring 622, detent 624, and bayonet 634, all of which are arranged with hinge housing 614.

Figure 21A:
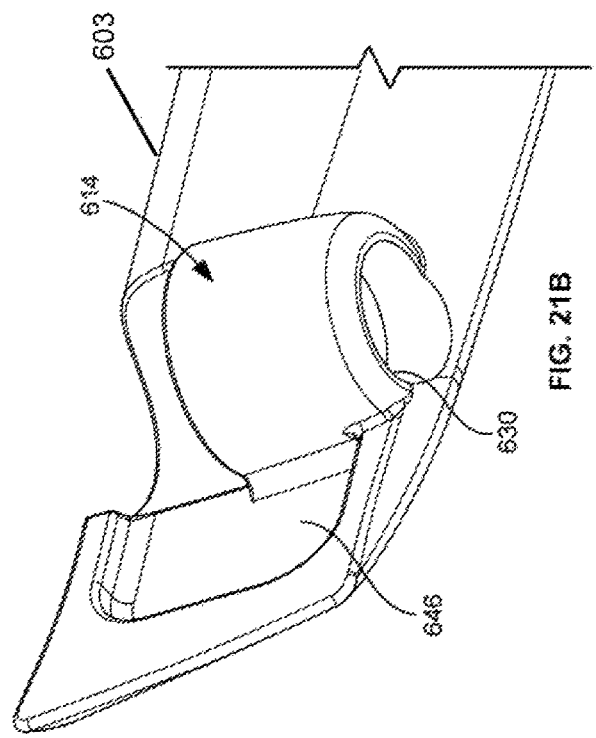
FIGS. 21A and 21B are enlarged perspective top and bottom views of another component of the example hinge and connector assembly of FIG. 20.
Figure 21B:
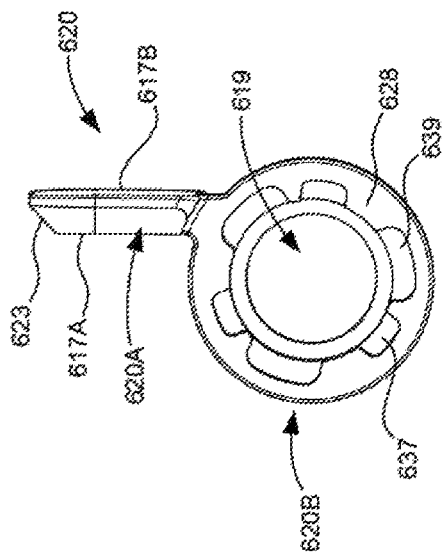

Hinge housing 614 of hinge and connector assembly 606, as shown in more detail in FIGS. 21A-21B, is an example component of hinge and connector assembly. For example, hinge housing 614 has a rounded shape and an opening 615 extending therethrough. As shown, hinge housing 614 includes a top edge surface 626 and a bottom edge surface 630. Hinge housing 614 also further includes a first recessed surface 635A and a second recessed inner surface 635B extending around the circumference of hinge housing 614. In this example, hinge housing 614 is integrally formed with outer housing 603 of removable temple arm 600. In other embodiments, hinge housing 614 may instead be comprised of a separate tab housing that is attached or secured to removable temple arm 600.

Figure 22A:
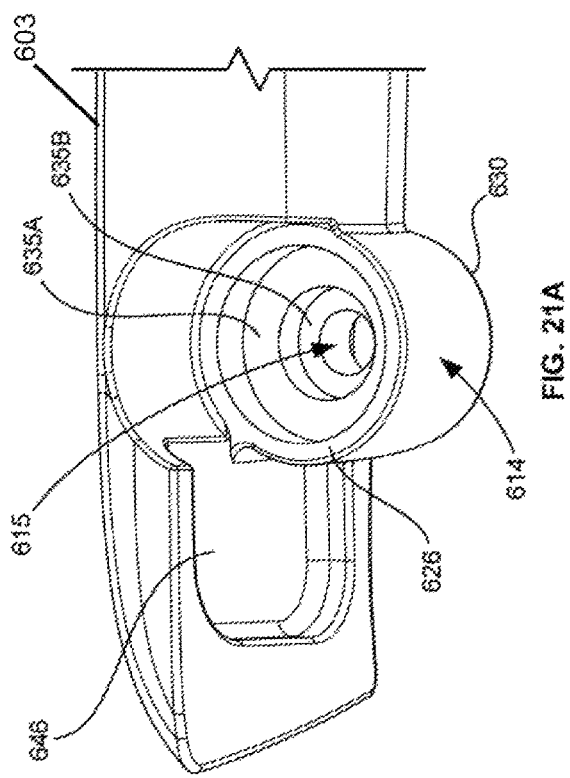
FIGS. 22A and 22B are, respectively, an enlarged perspective view and a top plan view of another example component of the example hinge and connector assembly of FIG. 20.
Figure 22B:
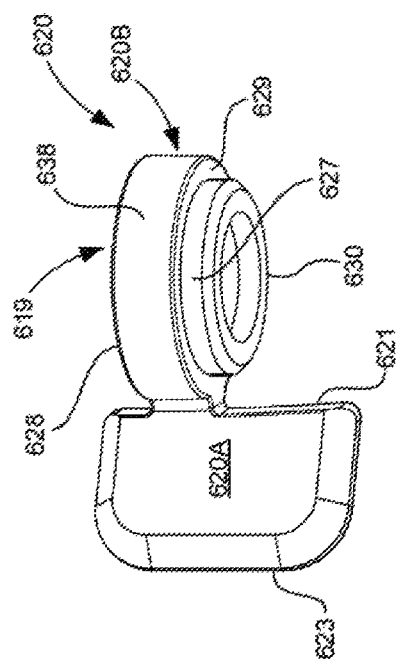

Locking mechanism 620 is another example component of hinge and connector assembly 606 that permits a user to interlock removable temple arm 600 with eyewear. As seen in more detail in FIGS. 22A-22B, locking mechanism 620 includes pull tab 620A and tab housing 620B. Pull tab 620A has an elongated body with one generally straight edge 621 and an opposed rounded edge 623. The profile of pull tab 620A is curved on one side 617A and flat on the opposed side 617B. Tab housing 620B is connected to edge 621 of pull tab 620A and extends in a direction perpendicular to edge 621 of pull tab 620A. Tab housing 620B has a generally circular shape with an opening 619 extending therethrough. As best seen in FIG. 22A, tab housing 620B is tiered having a first outer circumferential edge 638 and a smaller second outer circumferential edge 627. Tab housing 620B also includes a top edge surface 628 and a bottom edge surface 630. In this example, pull tab 620A is integrally formed with tab housing 620B. In other embodiments, tab housing may be separately formed and joined together with pull tab.

Bayonet 634, as shown in FIGS. 23A-23B, is another example component of hinge and connector assembly 606 and is substantially similar to bayonet 134 previously discussed with regard to optics arm 100,100'. In this example, bayonet 634 only differs to the extent that bayonet 634 includes a planar top edge surface 643. In other examples, such as those disclosed herein, bayonet 634 can include a recessed top edge surface. For ease of discussion, it is to be assumed that bayonet 634 possesses all features of bayonet 134, as discussed in FIGS. 8A-8C, and similar reference numerals will be used to describe similar elements. As previously discussed, bayonet 634 has a generally rounded shape with L-shaped legs 640A,640B,640C equally spaced around the circumference of bayonet 634. Legs 640A,640B, 640C further include feet 641A,641B,641C extending outwardly from main body 636 of bayonet 634. Each of legs 640A,640B,640C includes a corresponding ramp edge. For example, leg 640A includes ramp edge 652A; leg 640C includes ramp edge 652C; and leg 640B also includes an identical ramp edge (not shown). Recesses are positioned between each of the legs. For example, with reference to FIG. 23B, recess 644A is positioned between legs 640A and 640B; recess 644C is positioned between legs 640A and 640C; and recess 644B is positioned between legs 640B and 640C.

Detent 632 is another example component of hinge and connector assembly 606. For example, with reference back to FIG. 20, detent 632 is substantially similar to detent 132 discussed in connection with hinge and connector assembly 106,106' of optics arm 100,100'. For ease of discussion, it is to be assumed that detent 632 possesses the same features and alternative features of detent 132, and similar reference numerals will be used to describe similar elements. Detent 632 has an overall round shape that includes an opening to receive shaft screw 115. Three feet 633A,633B,633C, equally spaced around the circumference of detent 632, extend downward. As shown, each of detent feet 633A, 633B,633C includes a top surface 629A,629B,629C. Detent feet 633A,633C each include angled edges 637A,637C extending downward away from respective top surfaces 629A,629B. The angled edge extending downward from top surface 629B of foot 633B is not shown in this view.

With reference still to FIG. 20, as also discussed with regard to prior examples, feet 633A,633B,633C of detent 632 extend through lower openings 625 in bayonet 634. Lower openings 625 extend around bayonet 634 so that feet 633A,633B,633C of detent 632 can be exposed through lower openings 625. Top surface 629A of foot 633A of detent 632 is positioned within and exposed through opening 625A of bayonet 634. Top surface 629A and angled edge 637A of foot 633A are therefore also exposed within recess 644A of bayonet 634. As in previous embodiments, each of the remaining feet 633B,633C of bayonet 634 is also exposed through identical openings in bayonet 634.

Figure 24:
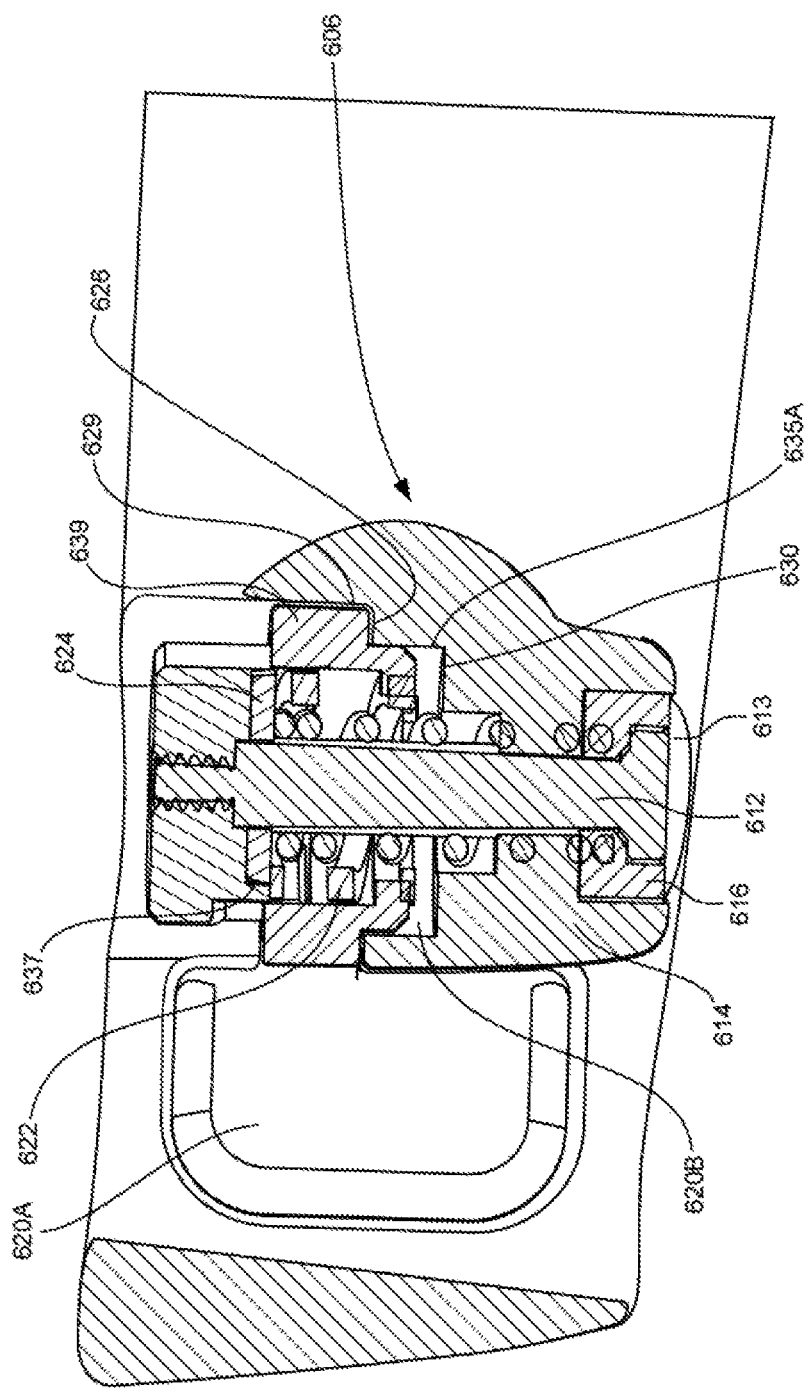
FIG. 24 is a cross-sectional view of the example hinge and connector assembly of the component shown in FIG. 19A.

A cross-sectional view of hinge and connector assembly 606 is shown in FIG. 24. As shown in this example, bushing 616 is positioned adjacent bottom edge 613 of hinge housing 614. Central shaft screw 612 extends through each of the components of hinge and connector assembly 606 and is secured to bayonet 634. Tab housing 620B is seated within hinge housing 614. Upper bottom edge surface 629 of tab housing 620B is positioned adjacent top edge surface 626 of hinge housing 614. Detent 632 overlies tab housing 620B and is positioned within first recesses 637 of tab housing 620B, as well as bayonet 634.

Detent spring 622 is positioned around shaft screw 612 and biases detent 632 toward bayonet 634. Bayonet 634 overlies detent 632 and is positioned at the uppermost portion of hinge housing 614. Each of the feet of bayonet 634 is positioned in second recess 639 of tab housing 620B, which is positioned between each of recesses 637 of tab housing 620B.

With reference still to FIG. 24, locking mechanism 620, including pull tab 620A and tab housing 620B, is movable with respect to hinge housing 614. Lower or second bottom edge surface 630 of tab housing 620B abuts surface 635A of hinge housing 614, and upper bottom edge surface 629 of tab housing 620B abuts top edge surface 626 of hinge housing 614. Movement of pull tab 620A away from removable temple arm 600 causes tab housing 620B to rotate about shaft screw 612. Because the feet of the bayonet are positioned within recesses 639 of tab housing 620B, movement of pull tab 620A also causes movement of bayonet 634 from a first position into a second position. Upper bottom edge surface 629 of tab housing 620B can move relative to top edge surface 626 of hinge housing 614. Surface 630 of tab housing 620B similarly moves relative to surface 635A of hinge housing 614.

Figure 25A:
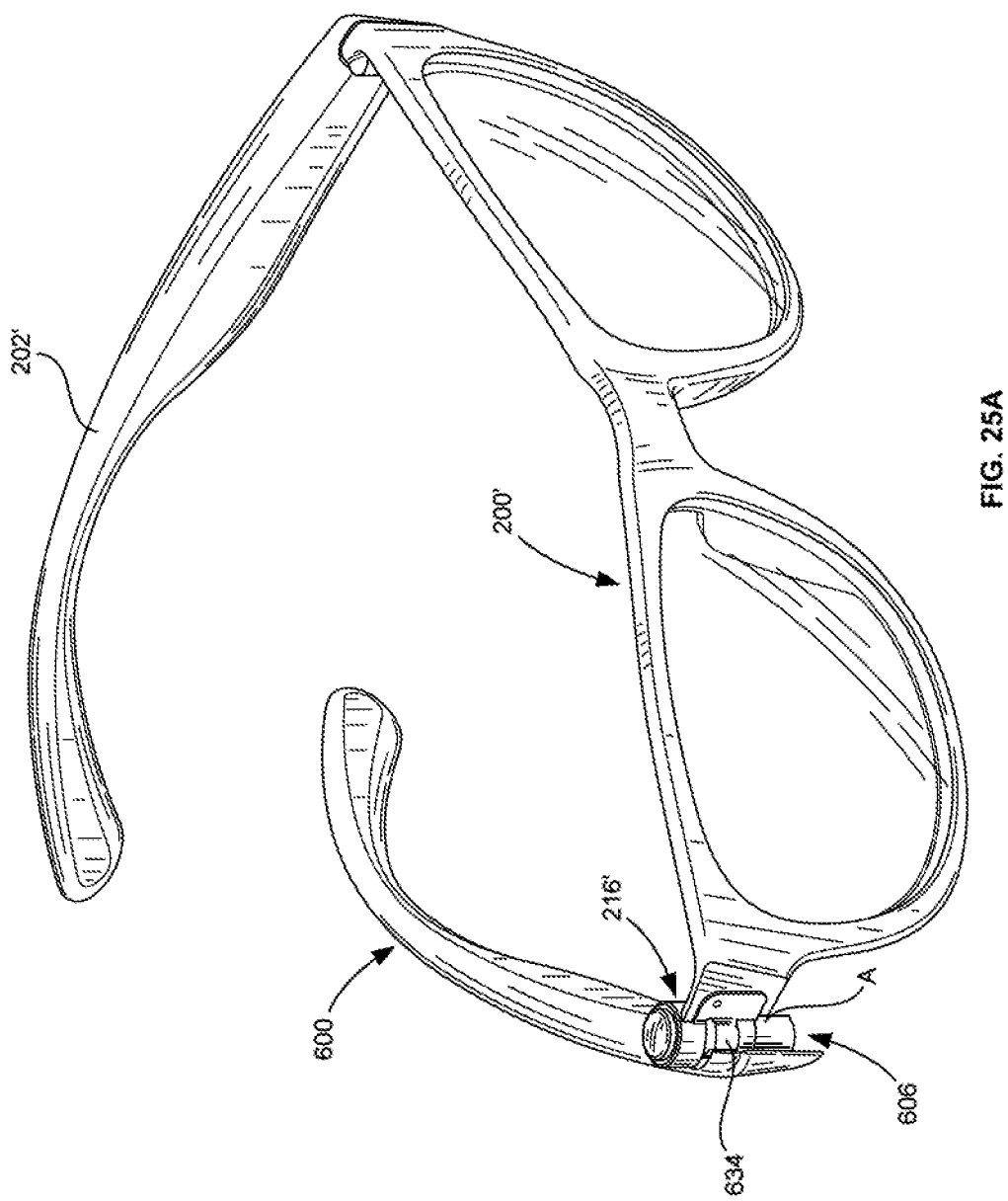
FIGS. 25A and 25B are respective front and side perspective views of a partially assembled interchangeable eyewear/head-mounted assembly of FIG. 18A.
Figure 25B:
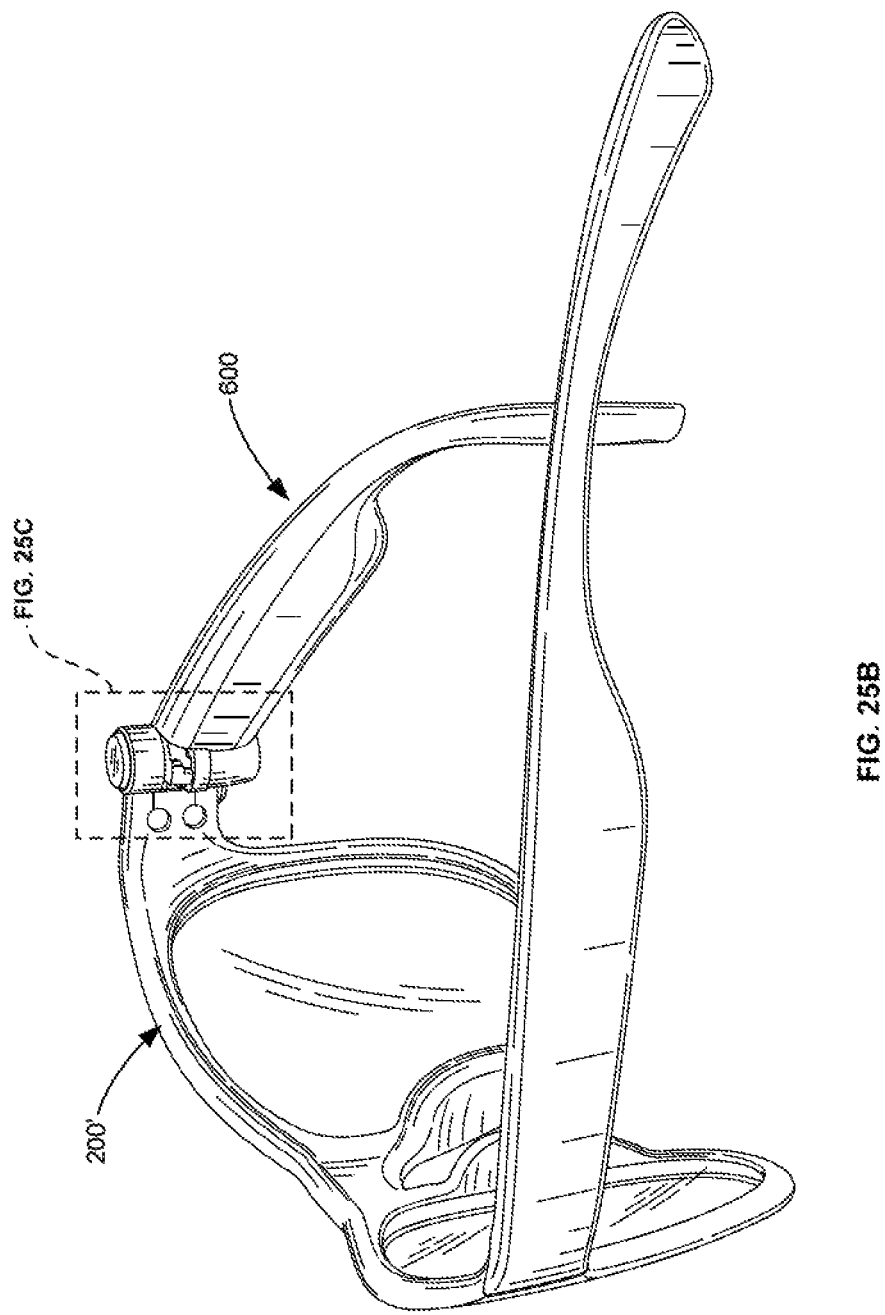
Figure 25C:
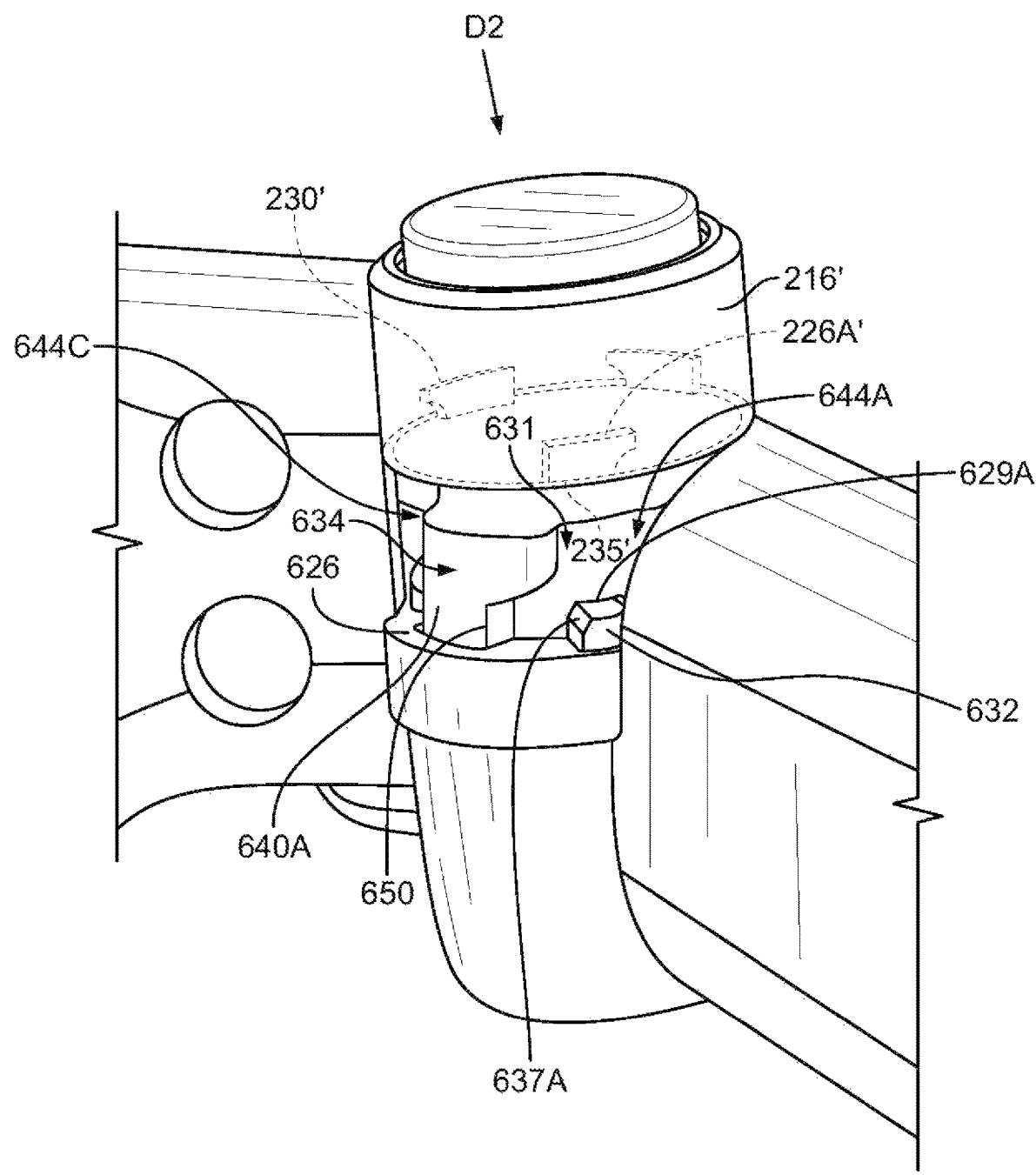
FIG. 25C is an enlarged view of a portion of FIG. 25B.

Turning to FIGS. 25A-25B, front and rear perspective views of removable temple arm 600, partially assembled with modified eyeglass frame 200, are shown. To assemble removable temple arm 600 and modified eyeglass frame 200' together, the connecting components of removable temple arm 600 and modified eyeglass frame 200' must be aligned. For example, as discussed in previous embodiments, each of the tabs of connector 216' of modified eyeglass frame 200' can be aligned with the openings in the recesses of bayonet 634. This can initially be accomplished by a user simply moving either the modified eyeglass frame or removable temple arm 600 relative to the other so that the tabs and openings in the bayonet 634 are aligned. For example, the position of modified eyeglass frame 200' relative to removable temple arm 600 when the openings in bayonet 634 are aligned with tabs on connector 216 is shown. Removable temple arm 600 is shown angled toward frame arm 202'. As best illustrated in FIG. 25C, tab 226A' of connector 216' is aligned with opening 631 in bayonet 634. Each of the remaining tabs 228',230' (not shown) of connector 216' is also aligned with respective openings in bayonet 634.

Once aligned, each of tabs 226',228',230' of connector 216' can be moved down into the respective recesses of bayonet, in the same manner previously discussed herein. For example, with reference still to FIG. 25C, when connector 216' is pushed downward in direction D2 or, alternatively, when removable temple arm 600 is moved toward connector 216', tab 226N will move into opening 631 and down into recess 644A until bottom tab edge 235' of tab 226A' is adjacent top surface 629A of foot 633A of detent 632. Tabs 228',230' (not shown) will also move into respective recesses 644B,644C (not shown) in the same way.

To interlock each of the tabs of connector 216' within corresponding recesses of bayonet 634, a user can manipulate bayonet 634 to move relative to connector 216'. In this example, as previously discussed, a user may move pull tab 620A (not shown in this view of FIG. 25C), which can be positioned within a recess of removable temple arm 600 during assembly in a first direction A. (FIG. 19B.) This moves pull tab 620A away from and out of recess 646 of removable temple arm 600 and closer toward modified eyeglass frame 200'. In one example, pull tab 620A rotates bayonet 634 approximately 30° about shaft screw 612, although in other examples, bayonet 634 can be rotated less or greater than 30°.

Figure 26:
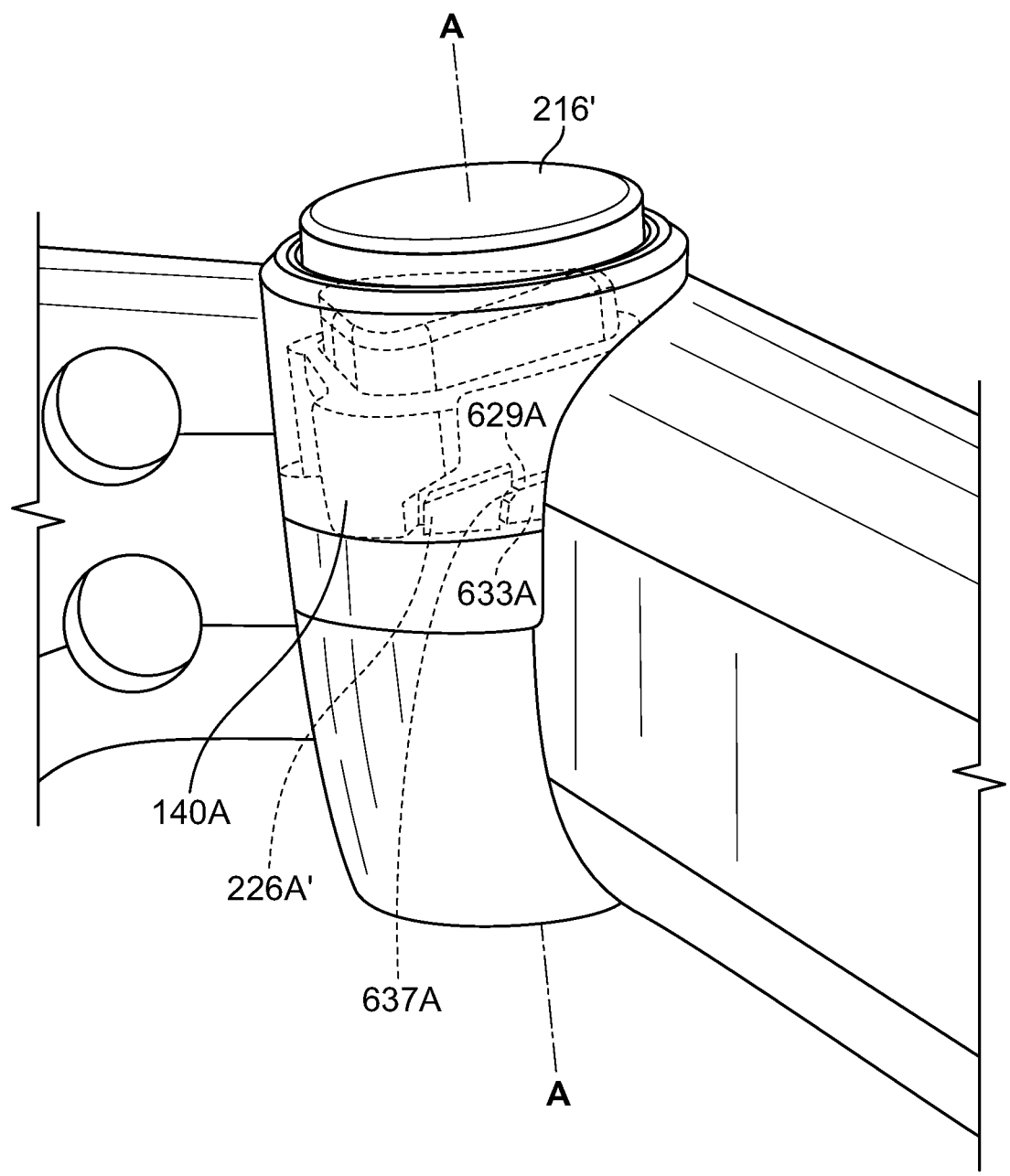
FIG. 26 is an enlarged perspective view showing interior components of the interchangeable eyewear/head-mounted assembly of FIG. 18A.

Movement of pull tab 620A and bayonet 634 causes each of ramp edges 652A,652C of bayonet 634, as well as feet 633A,633B,633C of detent 632, to also move relative to tabs 226',228',230'. Tab 226A' will therefore remain stationary, while ramp edges 652A,652C of bayonet 634, as well as feet 633A,633B,633C or moved relative to tab 226A'. For example, as shown in FIG. 26, once bayonet 634 has been rotated, tab 226A' is positioned between angled edge 637A of foot 633A of detent 632 and edge 650 of leg 640A of bayonet 634. The new position of tab 226A' within recess 644A interlocks tab 226A' of connector 216' with bayonet 634, such that modified eyeglass frame 200' and removable temple arm 600 are secured together. Each of remaining tabs 228',230' also interlocks with bayonet 634 in the same way. In this arrangement, bayonet 634 is rotated about axis A to connect with eyewear, such as modified eyeglass frame 200'.

Removable temple 600 can also rotate about axis A relative to modified eyeglass frame 200'.

When it is desired to disassemble eyeglasses 520, and separate removable temple arm 600 away from modified eyeglass frame 200', pull tab 620A can be moved in the opposite direction away from the frame toward removable temple arm 600. In one example, pull tab 620A is rotated 30° in a clockwise direction although, in other examples, the bayonet can be rotated less or greater than 30°. Movement of pull tab 620A causes each of ramp edges 652A and 652C of bayonet 634 to move relative to tab 226' of connector 216'. Ramp of leg 640A is not seen in these views, but is identical to ramps 652A,652C. Tabs 226',228',230' are then aligned with respective openings 631 in the respective recesses 640A,640B,640C so that modified eyeglass frame 200' can be pulled apart from removable temple arm 600. Pull tab 620A will also be repositioned within a recess of removable temple arm 600.

Figure 27:
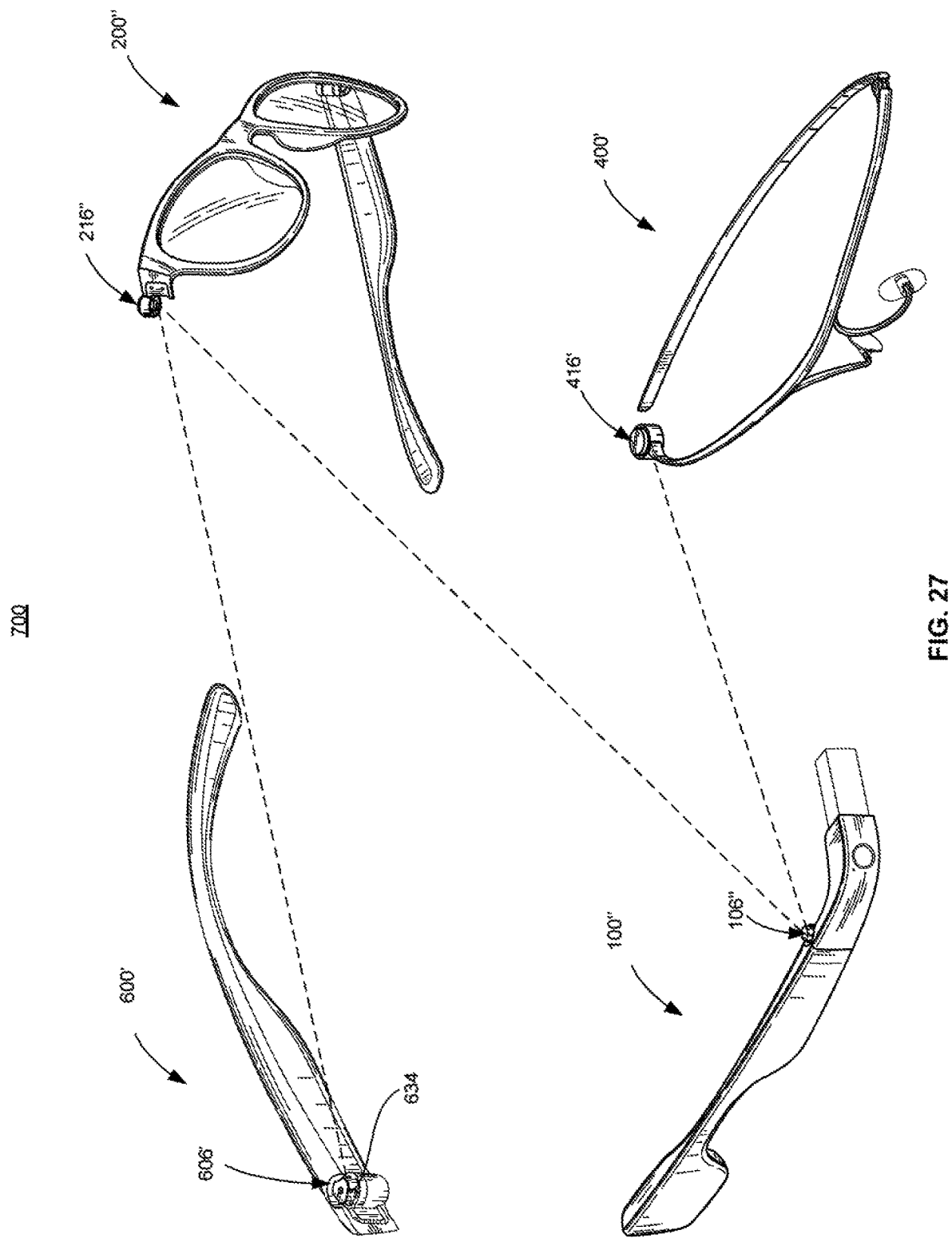
FIG. 27 is a perspective view of components of another example eyewear assembly in accordance with the disclosed embodiments.

Turning now to FIG. 27, components of an interchangeable eyewear/head-mounted device assembly 700 are shown. In this example, the components of interchangeable eyewear/head-mounted device assembly 700 include an optics arm 100", a modified eyeglass frame 200", a band 400', and a removable temple arm 600'. Each of these components are identical to the corresponding components previously described herein and similar reference numerals are used to indicate similar components.

Some of the components of the interchangeable eyewear/head mounted device assembly 700 can be used to form head-mounted devices. For example, hinge and connector assembly 216" of modified eyeglass frame 200" can interlock with optics arm 100" to form a head-mounted device, such as previously shown in FIG. 1. In another example, connector 416' of band 400' can be joined with hinge and connector assembly 106" of optics arm 100" to form an alternate head-mounted device, such as shown in FIG. 16.

The components of the interchangeable eyewear/head-mounted device assembly can also be used to form an eyeglass frame, such as previously shown in FIG. 18A. For example, modified eyeglass frame 200" can be joined with removable temple arm 600'. In this example, connector 216" of modified eyeglass frame 200" interlocks with bayonet 634' of hinge and connector assembly 616' of removable temple arm 600'.

Components of assembly 700 can be interchanged with one another without the need for external tools. The interchangeability among the different components can provide the user with a variety of options for use of interchangeable eyewear/head-mounted device assembly 700. Two or more of the components of the assembly can be grouped together in one kit or each of the components may be kept and stored individually. It is to be appreciated that assembly 700 only presents one example assembly, and other types of components or alternative configurations of these components may be included that are also interchangeable with these components.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "in this example," "for example," "such as," "including," and the like, should not be interpreted as limiting the subject matter of the claims to the specific examples; rather, the examples are intended to illustrate only one of many possible embodiments. Further, the same or similar reference numbers in different drawings can identify the same or similar elements.

The invention claimed is:

1. An eyeglass optics side arm comprising:
    an optics temple having a first end;
    an optics pod having a first end and a second end;
    a display positioned on the first end of the optics pod; and
    a hinge assembly positioned at the first end of the optics temple, the hinge assembly including a first axis, the second end of the optics pod rotatably engaged with the hinge assembly,
    wherein the optics pod is configured to rotate about the first axis of the hinge assembly from a first folded position, where the second end of the optics pod is adjacent the first end of the optics temple, to a second elongated position, where the second end of the optics pod is at a distance away from the end of the optics temple greater than in the first position, wherein the optics pod is curved such that, in the first position, the optics temple is parallel with a portion of the optics pod and transverse to the display.

2. The eyeglass optics side arm of claim 1, wherein, in the first position, the end of the optics pod is in contact with the end of the optics temple.

3. The eyeglass optics side arm of claim 1, wherein the hinge assembly includes a first connection secured to the second end of the optics pod.

4. The eyeglass optics side arm of claim 3, wherein the hinge assembly includes a second connection secured to the end of the optics temple.

5. The eyeglass optics side arm of claim of claim 4, wherein the second connection is rotatably received within the first connection.

6. The eyeglass optics side arm of claim 5, further comprising a screw secured to the first connection, the screw being received within the first connection and the second connection.

7. The eyeglass optics side arm of claim 1, further comprising an image actuator assembly overlying the hinge assembly.

8. The eyeglass optics side arm of claim 7, wherein the image actuator assembly includes a spring and a button, the spring biasing the button away from the end of the hinge assembly along the first axis.

9. A modular kit for an eyewear/head-mounted device assembly, the modular kit comprising:
    an eyeglass frame unit comprising a central frame support having first and second ends, and a connector extending from a first end of the central frame support; and
    an eyeglass optics side arm configured for removable connection to the connector mechanism and rotatably connected to the eyeglass frame unit, the eyeglass optics side arm comprising:
    an optics temple having a first end;
    an optics pod having a first end and a second end;
    a display positioned on the first end of the optics pod; and
    a hinge assembly positioned at the first end of the optics temple, the hinge assembly including a first axis, the second end of the optics pod rotatably engaged with the hinge assembly,
    wherein the optics pod is configured to rotate about the first axis of the hinge assembly from a first folded position, where the second end of the optics pod is adjacent the first end of the optics temple, to a second elongated position, where the second end of the optics pod is at a distance away from the end of the optics temple greater than in the first position, wherein the optics pod is curved such that, in the first position, the optics temple is parallel with a portion of the optics pod and transverse to the display.

10. The kit of claim 9, further comprising an image actuator assembly overlying the hinge assembly.

11. The kit of claim 9, wherein, in a first orientation, the connector is configured to overlie the hinge assembly and, in a second orientation, the connector is configured to be received within the hinge assembly along the first axis.

12. The kit of claim 11, wherein the eyeglass frame unit is configured to be rotated between a third position and a fourth position relative to the optics temple, and when the eyeglass frame unit moves from the third position to the fourth position, the connector moves relative to the optics temple and removably interlocks with the hinge assembly when the connector is received within the hinge assembly.

13. The kit of claim 9, wherein, in the first position the end of the optics pod is in contact with the end of the optics temple.

14. The kit of claim 9, wherein the hinge assembly includes a first connection secured to the second end of the optics pod.

15. The kit of claim 14, wherein the hinge assembly includes a second connection secured to the end of the optics temple.

16. The kit of claim 15, wherein the second connection is rotatably received within the first connection.

17. Eyewear comprising:
    an eyeglass frame unit comprising a central frame support having first and second ends, and a connector extending from a first end of the central frame support; and
    an eyeglass optics side arm configured for removable connection to the connector mechanism and rotatably connected to the eyeglass frame unit, the eyeglass temple optics side arm comprising:
    an optics temple having a first end;
    an optics pod having a first end and a second end;
    a display positioned on the first end of the optics pod;
    a hinge assembly positioned at the first end of the optics temple, the hinge assembly including a first axis, the second end of the optics pod rotatably engaged with the hinge assembly,
    wherein the optics pod is configured to rotate about the first axis of the hinge assembly from a first folded position, where the second end of the optics pod is adjacent the first end of the optics temple, to a second elongated position, where the second end of the optics pod is at a distance away from the end of the optics temple greater than in the first position; and
    wherein the eyeglass frame unit is configured to be rotated between a third position and a fourth position relative to the optics temple, and when the eyeglass frame unit moves from the third position to the fourth position, the connector moves relative to the optics temple and removably interlocks with the hinge assembly.

18. The eyewear of claim 17, wherein, in the fourth position, the connector is received within the hinge assembly.

\* \* \* \* \*